(12) United States Patent
Li et al.

(10) Patent No.: US 11,506,777 B2
(45) Date of Patent: Nov. 22, 2022

(54) RFID TAG LOCATION AND ASSOCIATION OF RFID TAGS

(71) Applicants: Brandon Li, Cedar Knolls, NJ (US); Gregory Li, Cedar Knolls, NJ (US)

(72) Inventors: Brandon Li, Cedar Knolls, NJ (US); Gregory Li, Cedar Knolls, NJ (US)

( * ) Notice: Subject to any disclaimer, the term of this patent is extended or adjusted under 35 U.S.C. 154(b) by 28 days.

(21) Appl. No.: 16/756,368

(22) PCT Filed: Mar. 22, 2019

(86) PCT No.: PCT/US2019/023534
§ 371 (c)(1),
(2) Date: Apr. 15, 2020

(87) PCT Pub. No.: WO2019/190903
PCT Pub. Date: Oct. 3, 2019

(65) Prior Publication Data
US 2021/0364625 A1 Nov. 25, 2021

Related U.S. Application Data

(60) Provisional application No. 62/770,975, filed on Nov. 23, 2018, provisional application No. 62/755,677, (Continued)

(51) Int. Cl.
*G01S 13/75* (2006.01)
*G01S 13/87* (2006.01)
(Continued)

(52) U.S. Cl.
CPC .......... *G01S 13/878* (2013.01); *G01S 7/023* (2013.01); *G01S 13/605* (2013.01); *G01S 13/75* (2013.01)

(58) Field of Classification Search
None
See application file for complete search history.

(56) References Cited

U.S. PATENT DOCUMENTS

| 5,896,060 A | * | 4/1999 | Ovard | ...................... H04L 1/06 |
| | | | | 375/330 |
| 6,208,062 B1 | * | 3/2001 | Nysen | .................. G06K 7/0008 |
| | | | | 333/152 |

(Continued)

FOREIGN PATENT DOCUMENTS

| WO | 2015/099890 A2 | 7/2015 |
| WO | 2017/222510 A1 | 12/2017 |

OTHER PUBLICATIONS

Borisenko, A., Bolic, M. & Rostamian, M. Intercepting UHF RFID signals through synchronous detection. J Wireless Com Network 2013, 214 (2013). https://doi.org/10.1186/1687-1499-2013-214, EURASIP Journal on Wireless Communications and Networking 2013 2013:214, pp. 1-10, SpringerOpen.

(Continued)

*Primary Examiner* — John F Mortell
(74) *Attorney, Agent, or Firm* — Capitol Patent & Trademark Law

(57) ABSTRACT

An RFID detector suitable for use in a passive RFID tag system that employs frequency hopping spread spectrum (FHSS) operation obtains an indication of at least one characteristic of a CW RF signal employing a hopped-to carrier frequency that is being transmitted from an RFID tag reader, e.g., for use in activating the RFID tag to be located, the indication of the characteristic being obtained based on a signal that is received from a source other than the RFID detector. The RFID detector may use the obtained indication of the characteristic of the CW RF signal to determine at least one position related parameter for the RFID tag. A location, e.g., of the tag, of a group of tags, of the RFID detector, or of another RFID detector, may be determined based on the position parameter.

20 Claims, 11 Drawing Sheets

Related U.S. Application Data filed on Nov. 5, 2018, provisional application No. 62/750,403, filed on Oct. 25, 2018, provisional application No. 62/744,366, filed on Oct. 11, 2018, provisional application No. 62/723,437, filed on Aug. 27, 2018, provisional application No. 62/691,601, filed on Jun. 28, 2018, provisional application No. 62/681,793, filed on Jun. 7, 2018, provisional application No. 62/666,109, filed on May 3, 2018, provisional application No. 62/647,723, filed on Mar. 24, 2018.

(51) Int. Cl.
*G01S 7/02* (2006.01)
*G01S 13/60* (2006.01)

(56) References Cited

U.S. PATENT DOCUMENTS

| | | | |
|---|---|---|---|
| 6,414,626 B1* | 7/2002 | Greet | G06K 7/0008 342/51 |
| 6,836,468 B1* | 12/2004 | O'Toole | H03L 7/148 342/51 |
| 7,423,516 B2 | 9/2008 | Overhultz | |
| 8,072,311 B2 | 12/2011 | Sadr et al. | |
| 8,237,562 B1 | 8/2012 | Picasso et al. | |
| 8,294,554 B2 | 10/2012 | Shoarinejad et al. | |
| 8,305,191 B2 | 11/2012 | Dembo et al. | |
| 8,754,752 B2 | 6/2014 | Shoarinejad et al. | |
| 8,988,197 B2 | 3/2015 | Wild et al. | |
| 2001/0016479 A1* | 8/2001 | Wood, Jr. | H04B 7/0608 455/277.1 |
| 2007/0285245 A1 | 12/2007 | Djuric et al. | |
| 2009/0257473 A1* | 10/2009 | Tuttle | H04B 1/713 375/135 |
| 2009/0257474 A1* | 10/2009 | Tuttle | H04B 1/713 375/135 |
| 2010/0156651 A1 | 6/2010 | Broer | |
| 2014/0022059 A1 | 1/2014 | Horst et al. | |
| 2016/0363664 A1* | 12/2016 | Mindell | G01S 13/84 |
| 2017/0328996 A1 | 11/2017 | Shoarinejad et al. | |

OTHER PUBLICATIONS

D. De Donno, F. Ricciato, L. Catarinucci, and L. Tarricone, "Design and Applications of a Software-Defined Listener for UHF RFID Systems," 2011 IEEE MTT-S International Microwave Symposium Digest, pp. 1-4, Baltimora, MD, USA, Jun. 2011.
Written Opinion of the Intl Search Authority in PCT/US2019/023534 dated Jun. 27, 2019.

* cited by examiner

RFID TAG LOCATION AND ASSOCIATION OF RFID TAGS

CROSS-REFERENCE TO RELATED APPLICATIONS

This application claims benefit of United States provisional patent applications 1) 62/647,723 filed on 2018 Mar. 24 entitled Systems and methods for tracking a passive RFID tag, 2) 62/666,109 filed on 2018 May 3 entitled Devices, systems and methods for identifying and associating multitude of passive RFID Tags, 3) 62/681,793 filed on 2018 Jun. 7 entitled RFID location systems, methods and devices, 4) 62/691,601 filed on 2018 Jun. 28 entitled RFID location systems, methods and devices, 5) 62/702,498 filed on 2018 Jul. 24 entitled RFID location systems, methods and devices, 6) 62/723,437 filed on 2018 Aug. 27 entitled RFID location systems, methods and devices, 7) 62/744,366 filed on 2018 Oct. 11 entitled RFID location systems, methods and devices, 8) 62/750,403 filed on 2018 Oct. 25 entitled Devices, systems and methods for RFID location and association of a group of objects to a user ID, 9) 62/755,677 filed on 2018 Nov. 5 entitled Devices, systems and methods for RFID location and association of a group of objects to a user ID, and 10) 62/770,975 filed on 2018 Nov. 23 entitled Tracking, Associating and Security. The contents of all of the foregoing applications are incorporated herein by reference.

TECHNICAL FIELD

The present invention relates to radio frequency identification (RFID), and in particular, to location of RFID tags.

BACKGROUND OF THE INVENTION

A conventional RFID system typically includes readers, also known as interrogators, and tags, also known as transponders. There are short range, near field systems as well as longer range, so-called ultra high frequency (UHF), systems. There are generally two type of standardized UHF RFID systems, active RFID systems, e.g., that conform to the ISO/IEC 18000-7, standard and passive RFID systems, e.g., that conform to the International Organization for Standardization and the International Electrotechnical Commission (ISO/IEC) 18000-6 family of standards. An active RFID tag has a battery to power the circuitry such that the tag can operate further away from the reader. A passive RFID tag receives both information and operating energy from an RF signal transmitted by a reader.

The most widely available passive RFID tags include ISO/IEC18000-6 Type C or EPC Radio-Frequency Identity Protocols Generation-2 UHF RFID (EPCglobal® Gen2) tags. A reader may obtain information from a passive tag by transmitting a continuous wave (CW) RF signal to the tag and having the tag respond by modulating the reflection coefficient of the tag's antenna, thereby backscattering the CW RF signal to create an information that is received by the reader.

Passive tags can operate at low frequency, high frequency, and ultra-high frequency. Low-frequency systems generally operate at, for example, 124 kHz, 125 kHz or 135 kHz. High-frequency systems use, for example, 13.56 MHz while ultra-high frequency systems use, for example, a band anywhere from 860 MHz to 960 MHz. Some systems also use, for example, 2.45 GHz or other areas of the radio spectrum.

There is also a hybrid type of tag that employs a battery and so need not get all of its operating energy from the reader's RF waveform. Such a tag is known as a battery assisted passive (BAP) RFID tag or a semi-passive tag. A BAP RFID tag, such as an ISO/IEC18000-6 Type D tag, transmits information to a reader using backscattering in a manner similar to that employed by a passive tag. An ISO/IEC 18000-6 type D compliant BAP tag, also known as tag-only-talk-after-listen (TOTAL) tag, only needs a continuous wave (CW) RF signal to activate and sustain communications since such tags only transmit messages with pre-programmed parameters.

An RFID reader, e.g., an ISO/IEC 18000-6 type C or EPCglobal Gen2 compliant RFID reader, usually starts an interrogation session by sending a CW RF signal to activate compatible RFID tags in its coverage range. The reader sends interrogation messages to the tags by modulating on the CW RF signal, which acts as a carrier, coded interrogation messages.

The communication between the RFID reader and each of the RFID tags is usually established using a random-access procedure such that a one-on-one connection between the RFID reader and one of the RFID tags is established. Such a procedure, upon completion, allows the data of each tag to be read even though there are other similar tags in the same general area, and so each tag is said to be singulated for the interrogation session. More generally, singulation is a method by which an RFID reader identifies and communicates with a specific tag. This is necessary because if multiple tags were to respond simultaneously to an interrogation message, such responses would interfere with each other, rendering it impossible for the reader to determine the contents of any of the responses. In a typical practical application, it is possible that hundreds of tags might be within the range of the reader. However, when all the tags cooperate with the tag reader and follow the same anti-collision protocol, also called a singulation protocol, then the reader can read data from each and every tag without interference from the other tags. Singulation has to be performed for each session for each tag. As each tag is singulated, the RFID tag may be accessed and updated for the interrogation session.

Each tag has a unique tag identification (UTID), e.g., a number, which may be referred to as electronic product code (EPC), stored in its memory and which distinguishes the tag from all other possible tags, and in particular, from amongst the various tags that are in range to communicate with the reader. The UTID is typically associated with a specific instance of a product that the tag is affiliated with. The UTID of an RFID tag may include a 96-bit unique item identification (UII) or an electronic product code (EPC) for EPCglobal Gen2 tag.

Passive RFID tags are typically very small and may be placed on a variety of items including, for example, equipment, products, or even people. Identification of such items may be made by a reader via their tags. Accordingly, RFID systems may be used to track inventory in a warehouse or the number of products on a store's shelves, to name just a few example applications.

Currently, standard passive RFID readers are not suitable for tracking locations and movements of RFID tags. This is because, in part, each RFID tag can only interact with a single RFID reader at any given time. A standard passive RFID reader utilizes some components of its transmit path along with parameters that are employed by its transmit path as part of, and in the operation of, its receive path. For example, the reader's receive path relies on the parameters of a tag coding scheme for an RFID interrogation session. The tag coding scheme parameters are sent to the RFID tags by the reader's transmit path and are used by the reader's receive path to correctly decode signals received in response from the RFID tags. Also, a carrier signal from a frequency synthesis circuit used by the reader for transmitting the CW RF signal is applied directly to the backscattering receive path of the reader to downconvert the tag response signals since the tag backscatters the CW RF signal to send back its responses.

These parameters are especially important for frequency hopping spread spectrum (FHSS) operation in which the carrier frequency is changed pseudo-randomly during a communication session to mitigate interference, e.g., as required by federal regulatory agencies. For this reason, prior art RFID arrangements that attempt to perform location of an RFID tag, e.g., a UHF RFID tag, by employing triangulation or multilateration (MLAT) techniques, have to use multiple readers or receiving antennas sequentially, i.e., at different times, to simulate the simultaneous measurements needed for such algorithms. This limitation significantly restricts the practical effectiveness of such arrangements in tracking moving tags since it usually takes a few seconds to accomplish each round of inventory sessions when there are multiple tags.

U.S. Pat. No. 8,294,554 discloses the use of a single reader that transmits and multiple readers that receive in parallel for use in determining a location for a tag. However, disadvantageously, such prior art arrangement does not appear to be suitable for use with FHSS operation.

As noted, an RFID reader usually transmits a strong CW RF signal so as to allow the tag to extract therefrom energy in order to power its internal circuitry and to create by backscattering an information signal that can be received by the reader. In some systems using digital modulation in the 902-928 MHz in the United States, e.g., an ISO/IEC18000-6 Type C or EPC Radio-Frequency Identity Protocols Generation-2 UHF (EPCglobal Gen2) RFID system, the reader may transmit up to 1 watt or 30 dBm from its antenna port. The receive sensitivity for the receive path of the RFID reader is usually limited by the interference from the leakage from the transmit path. Unfortunately, such leakage occurs even with sophisticated RF isolation and interference cancelation circuitry. Such high output RF power combined with spurious emission control restriction also requires sophisticated and large size electronic elements as well as a reliable power source which often increase the size and cost of passive RFID readers that are used for practical RFID tag tracking types of applications, thereby limiting their deployment. Furthermore, a reader usually has a large antenna so as to cover a large area in which there can be a large number of tags. The large size of the antenna usually limits location accuracy.

SUMMARY OF THE INVENTION

We have recognized that the challenges with passive RFID tag location systems that employ frequency hopping spread spectrum (FHSS) operation can be mitigated, in accordance with the principles of the invention, by an RFID detector that is suitable for use in a passive RFID tag system that employs frequency hopping spread spectrum (FHSS) operation, the RFID detector obtaining an indication of at least one characteristic of a CW RF signal employing a hopped-to carrier frequency that is being transmitted from an RFID tag reader, e.g., for use in activating the RFID tag to be located, the indication of the characteristic being obtained based on a signal that is received from a source other than the RFID detector. In accordance with further principles of the invention, a location, e.g., of the tag, of a group of tags, of the RFID detector, or of another RFID detector, may be determined based on the obtained indication of the at least one characteristic of the CW RF signal.

In accordance with an aspect of the invention, the RFID detector may obtain the indication of the characteristic of the CW RF signal based on the RFID detector's receipt of the CW RF signal transmitted from the tag reader. In accordance with an aspect of the invention, the RFID detector may obtain the indication of the CW RF signal characteristic by receiving such indication from an external source. In one embodiment of the invention, the indication of the characteristic of the CW RF signal is received from the external source in digital form, e.g., over a communication network.

In one embodiment of the invention, a characteristic of the CW RF signal that is indicated may be a frequency, e.g., a carrier frequency, thereof. In one embodiment of the invention a characteristic of the CW RF signal that is indicated may be a phase thereof.

In accordance with an aspect of the invention, the RFID detector extracts the RF signal that was sent by a tag using backscattering, i.e., the tag signal, from the total signal that is received at its antenna based on the obtained indication of the at least one characteristic of the CW RF signal. In this regard, it should be appreciated that the antenna of the RFID detector simultaneously receives the CW signal from the RFID tag reader and the backscattered signal from the RFID tag. In one embodiment of the invention, this is achieved by employing a regenerated carrier signal whose nature is based on the obtained indication.

In accordance with an aspect of the invention, toward the goal of determining a location, e.g., for at least the RFID tag, the RFID detector may use the obtained indication of the characteristic of the CW RF signal to determine at least one position-related parameter for the RFID tag. In an embodiment of the invention, the position-related parameter for the RFID tag may be based on the extracted backscattered signal from the RFID tag.

In one embodiment of the invention the RFID detector uses the obtained indication of the characteristic of the CW RF signal to measure the received signal strength indicator (RSSI) for the backscattered signal from the RFID tag. In an embodiment of the invention, the RSSI may be employed as the position-related parameter. In an embodiment of the invention the position-related parameter may be the RF phase rotation for the backscattered signal which is determined by the RFID detector based on the obtained indication of the characteristic of the CW RF signal. In yet another embodiment of the invention the position-related parameter may be a time stamp of an RF signal received from a singulated and identified tag, e.g., a time stamp indicating the arrival time of the backscattered signal. In yet a further embodiment of the invention, the position parameter is receipt of a valid signal from the RFID tag at the RFID detector.

In various embodiments of the invention, the RFID tag may be located using the at least one determined position parameter from one RFID detector either independently or in combination. Furthermore, determining the location of the RFID tag may be based on at least one position parameter from one RFID detector and information from at least one other device. Such information may be supplied by another RFID detector, e.g., one or more position parameters supplied therefrom. Such information may be information supplied by the RFID tag reader. Thus, for example, the obtained RSSI from the RFID detector may be combined with timing information from the RFID tag reader and an RSSI obtained by another RFID detector to determine the position of the tag.

In an embodiment of the invention, order to ascertain the location of an RFID tag, a particular backscattering from the tag should be a message from the RFID tag that is identifiable so that the device ascertaining the location can be aware that the versions of the message received at, respectively, an RFID detector and at least one other device, which may be, for example, another RFID detector or the RFID tag reader, correspond to the message from the RFID tag. This identification may be achieved, in one embodiment of the invention, based on the contents of the message, e.g., by determining that the message received at the RFID detector and the at least one other device have the same content. In another embodiment of the invention, the identification may be achieved based on a time of the message, e.g., a time of receipt and/or a time of transmission or the time of causing the transmission of the message by the RFID reader. Such time may be coordinated by the RFID reader or by a server.

More than one obtained characteristic may be employed to improve the accuracy of the process and the determined location.

In one embodiment, the RSSI measurements obtained at various RFID detectors in response to a tag message are normalized, which may enable the location of the RFID tag to be determined more accurately.

In accordance with another aspect of the invention, two or more objects, each of which has thereon a respective RFID tag, may be associated together by detecting certain attributes of their respective tags, such as their being within a predefined area at a particular time or being determined to be moving together.

DETAILED DESCRIPTION

Figure 1:
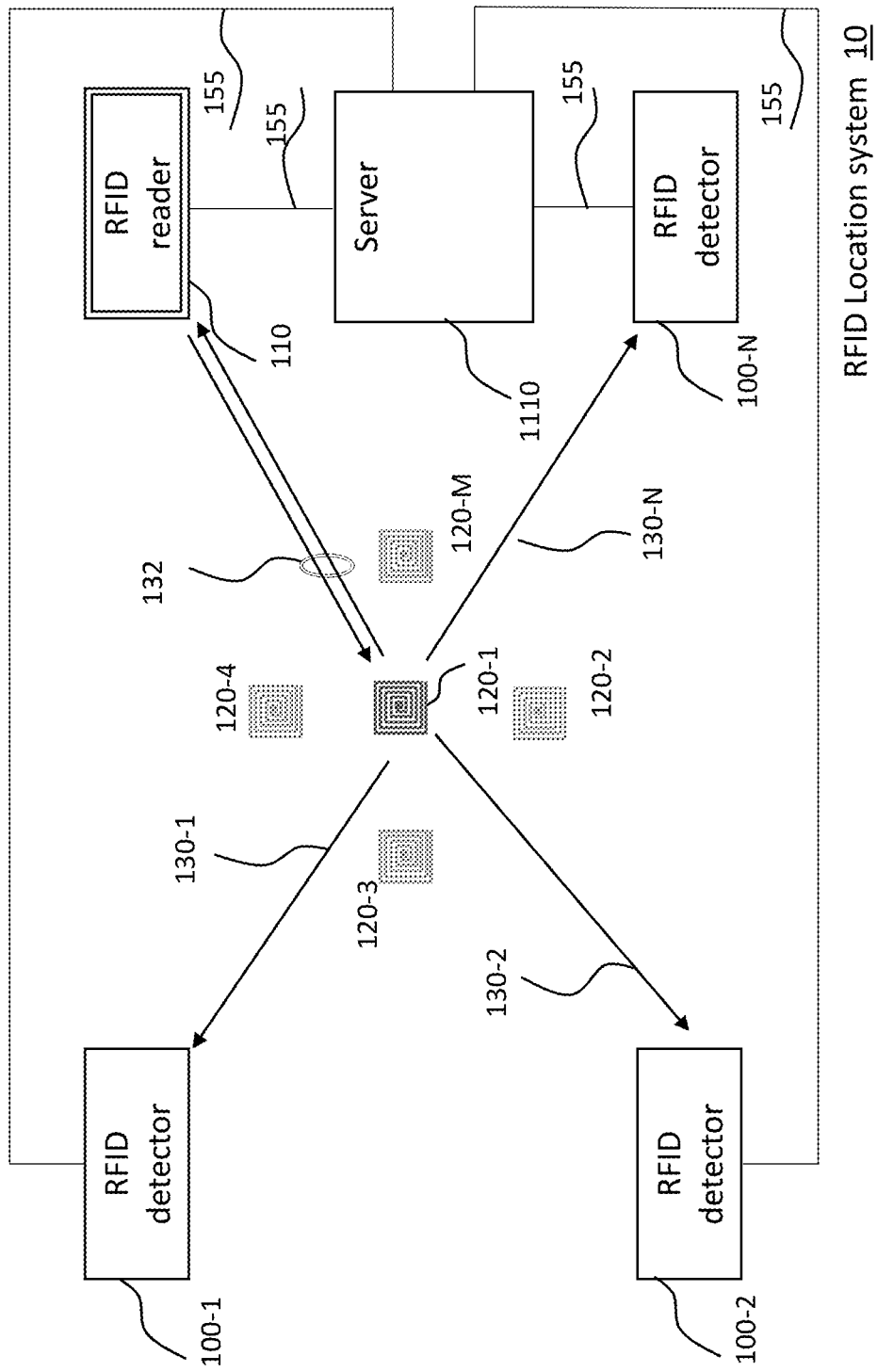
FIG. 1 shows an illustrative RFID location system arranged in accordance with the principles of the invention.

The following merely illustrates the principles of the invention. It will thus be appreciated that those skilled in the art will be able to devise various arrangements that, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry or components embodying the principles of the invention. Similarly, it will be appreciated that any flow charts, flow diagrams, state transition diagrams, pseudocode, process descriptions and the like represent various processes which may be substantially represented in computer readable medium and so executed by a computer or processor, whether or not such computer or processor is explicitly shown.

The functions of the various elements shown in the FIGS., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. A processor may have one or more so-called "processing cores". Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), graphics processing unit (GPU), read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function. This may include, for example, a) a combination of electrical or mechanical elements which performs that function or b) software in any form, including, therefore, firmware, microcode or the like, combined with appropriate circuitry for executing that software to perform the function, as well as mechanical elements coupled to software controlled circuitry, if any. The invention as defined by such claims resides in the fact that the functionalities provided by the various recited means are combined and brought together in the manner which the claims call for. Applicant thus regards any means which can provide those functionalities as equivalent as those shown herein.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the drawings are not drawn to scale.

In the description, identically numbered components within different ones of the FIGS. refer to the same components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "selecting", "assigning", "estimating", "determining", or the like, refer to the action and processes of a computer system, or similar computing device, that manipulates and transforms data represented as physical (electronic) quantities within the computer system's registers and memories into other data similarly represented as physical quantities within the computer system memories or registers or other such information storage, transmission, or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system or other electronic devices to perform a process according to the present invention. A machine-readable medium includes any mechanism for storing or transmitting information in a form readable by a machine (e.g., a computer). For example, a machine-readable, e.g., computer-readable, medium includes a machine, e.g., a computer, readable storage medium, e.g., read only memory ("ROM"), random access memory ("RAM"), magnetic disk storage media, optical storage media, flash memory devices, etc., a machine e.g., computer readable transmission medium (electrical, optical, acoustical or other form of propagated signals, e.g., carrier waves, infrared signals, digital signals, etc, and so forth.

In accordance with the principles of the invention, an RFID detector, which may be used in a passive RFID tag location system that employs frequency hopping spread spectrum (FHSS), obtains at least one indication of a characteristic of a CW RF signal that is being transmitted from a tag reader, at a hopped-to carrier frequency, toward an RFID tag for use in activating the tag which is to be located, the indication of the characteristic being obtained based on a signal that is received from a source other than the RFID detector. In accordance with further principles of the invention, a location, e.g., of the tag, a group of tags, the RFID detector, or another RFID detector, may be determined using the obtained indication of the at least one characteristic of the CW RF signal.

FIG. 1 shows an illustrative RFID location system 10 arranged in accordance with the principles of the invention. RFID location system 10 includes a conventional RFID reader 110, conventional RFID tags 120-1 through 120-M, where M is an integer equal to or greater than 1, referred to herein collectively as tags 120. RFID location system 10 also includes RFID detectors 100-1, 100-2, through 100-N, where N is an integer equal to or greater than 1, referred to herein collectively as RFID detectors 100, which are arranged to implement the principles of the invention. RFID location system 10 may be used to ascertain the location of, i.e., locate, at least a particular one of RFID tags 120.

In an embodiment of RFID location system 10, RFID reader 110 and tags 120 employ frequency hopping spread spectrum (FHSS) and may be compliant with one of the known RFID standards, such as ISO/IEC 18000-6 type C or type D standard, or it may be a reader-talk-first (RTF) passive RFID system, e.g., EPCglobal Class 1 Gen 2 reader.

RFID reader 110 interrogates RFID tags 120 that are within its range during each interrogation session. RFID reader 110 may address or otherwise specify a particular RFID tag to be interrogated using a singulation process. When only a particular tag is responding, e.g., because it has been singulated, its response may be received by each of RFID detectors 100 at substantially the same time, e.g., within the variation of the path length given the speed of electromagnetic radiation carrying the response.

For purposes of clarity, hereinbelow the functionality of RFID detectors 100 will generally be presumed to be only within such RFID detectors 100. However, one of ordinary skill in the art will readily recognize that such functionality may be implemented as well in RFID reader 110. For purposes herein, such RFID reader 110, when employing the functionality of RFID detector 100, may be considered to be one of RFID detectors 100.

In one embodiment, RFID reader 110 transmits, as an activation signal, a CW RF signal. The activation signal is sent at a frequency to which RFID reader 110 has hopped. The CW RF signal may be used to energize, i.e., power, a passive tag, e.g., tag 120-1. RFID reader 110 may also modulate the CW RF signal so as to use it to send information to, and to interrogate, RFID tag 120-1 in addition to providing energy for the tag. The CW RF signal is then typically continued unmodulated to allow the tag to backscatter the CW RF signal to create a backscattered signal carrying at least one tag message in response to the interrogation signal from RFID reader 110, as well as to harvest some power therefrom.

In another embodiment, where tags 120 are tag-only-talk-after-listen (TOTAL) tags, such as ISO/IEC 18000-6 type D tags, RFID reader 110 need only transmit as the activation signal a CW RF signal which the tag may backscatter into tag messages, as such tags only transmit messages according to pre-programmed parameters, so there is no need to interrogate such tags. Each such tag also eventually becomes singulated so that at a point in time only that one tag is responding.

Information may be communicated between each of RFID detectors 100 and optionally RFID reader 110, and server 150 over one of communication channels 155. Communication channels 155 may be any form of communication channel, e.g., wired, wireless and optical, and any combination thereof, and they may pass through one or more networks, which may be personal, local or wider area, and any combination thereof.

Figure 2:
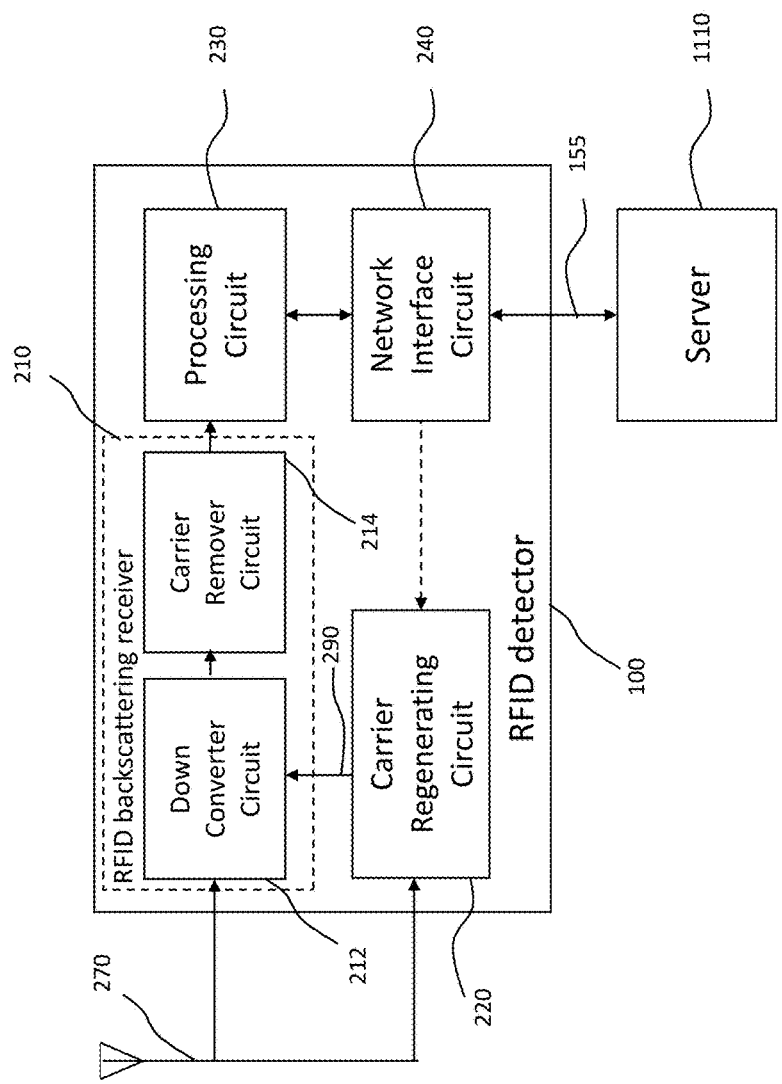
FIG. 2 shows an illustrative embodiment of one of RFID detectors of FIG. 1 which operates in a passive RFID mode in an environment employing frequency hopping spread spectrum and which is arranged in accordance with the principles of the invention.

Turning for a moment to FIG. 2, FIG. 2 shows an illustrative embodiment of one of RFID detectors 100 (FIG. 1) that operates in a passive RFID mode in an environment employing FHSS and which is arranged in accordance with the principles of the invention. RFID detector 100 includes RFID backscattering receiver 210, carrier regenerating circuit 220, processing circuit 230, and network interface circuit 240. RFID detector 100 may be coupled to server 150 (FIG. 1), e.g., as described hereinabove, over communication link 155 via network interface circuit 240.

RFID backscattering receiver 210 (FIG. 2) receives backscattered RF signals from an RFID tag, e.g., one of RFID tags 120 (FIG. 1) that is activated and singulated by an RFID reader, e.g., RFID reader 110 (FIG. 1), during an RFID interrogation session, via antenna 270.

RFID backscattering receiver 210 may include downconverter circuit 212 and carrier remover circuit 214. In an illustrative embodiment, downconverter 212 downconverts received backscattered RF signals from an RFID tag using a regenerated carrier signal supplied by carrier regenerator 220 as output 290 thereof.

Optional carrier remover circuit 214 eliminates the CW RF signal transmitted by the reader that was also simultaneously received by receiver 210 via antenna 270 and which is usually orders of magnitude stronger than the backscattered RF signal received from the RFID tag. Use of carrier remover circuit 214 may, advantageously, significantly improve the receive sensitivity of the detector to the backscattered signal.

It is generally desirable that the regenerated carrier signal generated by carrier regenerator 220 should have substantially the same frequency as the CW RF signal, which is currently being transmitted from the RFID reader. Indeed, in various embodiments such may be required by RFID detector 100 in order to properly receive the backscattered signal from a tag.

To this end, given that RFID reader 110 employs frequency hopping spread spectrum (FHSS), where, typically, each frequency that can be hopped to is selected from a set of allowed operating frequencies, as is often specified by regulations in various jurisdictions in which RFID reader 110 may be deployed, in order to regenerate a carrier signal that has substantially the same frequency as the CW RF signal currently being employed by RFID reader 110, it is necessary to obtain an indication of at least one characteristic of that CW RF signal. In accordance with the principles of the invention, such indication is obtained from a source other than RFID detector 100. In an embodiment of the invention, the indication of the characteristic is based on a signal that is received by RFID detector 100.

In an embodiment of the invention, RFID detector 100 may obtain the characteristic of the CW RF signal based on receipt by RFID detector 100, via antenna 270, of the CW RF activation signal transmitted from tag reader 110. In one embodiment of the invention, the characteristic of the CW RF signal that is obtained may be a frequency thereof, which is used by carrier regenerating circuit 220 to supply to RFID backscattering receiver 210 a regenerated carrier signal at the same frequency as that of the CW RF signal.

In another embodiment of the invention, an indication of a characteristic of the CW RF signal may be received by carrier regenerating circuit 220 from an external source, e.g., in digital form. Such indication may be received over communication link 155, e.g., via network interface circuit 240. In this embodiment of the invention, the characteristic of the CW RF signal that is indicated may also be a frequency thereof, which is used by carrier regenerating circuit 220 to supply to RFID backscattering receiver 210 a regenerated carrier circuit at the indicated frequency. The received information indicates to detector 100 which frequency to use at at least one particular time. In one embodiment of the invention, the information as to which frequency to use is supplied from RFID reader 110.

In such an embodiment of the invention the information as to which frequency to use may be supplied from server 150. Server 150 may know which frequency to indicate for any of several reasons. For example, the sequence of frequencies to use may be predetermined. Alternatively, RFID reader 110 may have indicated to server, e.g., over its associated one of communication links 155, which frequency is going to be used at a particular time.

In an embodiment of the invention, carrier regenerating circuit 220 may synthesize the carrier signal to have a frequency only from a list of allowed operating frequencies.

In one embodiment of the invention, the obtained indication of at least one characteristic of a CW RF signal indicates both a frequency and a phase thereof. In such an embodiment, the indicated frequency and phase may be used by carrier regenerating circuit 220 to supply to RFID backscattering receiver 210 a regenerated carrier that is synchronized in phase to the CW RF signal transmitted by RFID reader 110 and which is received at carrier regenerating circuit 220.

In accordance with an aspect of the invention, processing circuit 230 determines at least one position related parameter based on the backscattered RF signals received from a singulated and identified tag. Note that, as is well known, an RFID tag 120 may transmit its unique tag identifier (ID) in at least one of the messages it exchanges with the RFID reader 110. Based on the unique identifier, which one of the tags is the one for which the position parameter is determined can be known.

In one embodiment of the invention, the at least one position related parameter is the RSSI of an RF signal received from a singulated and identified tag. In one embodiment of the invention, the at least one position related parameter is the phase rotation of an RF signal received from a singulated and identified tag. In one embodiment of the invention, the at least one position related parameter is the time stamp of an RF signal received from a singulated and identified tag. In yet a further embodiment of the invention, the at least one position related parameter is receipt of a valid signal from the tag at the RFID detector.

Processing circuit 230 may optionally include circuitry to decode received backscattered RF signals from the RFID tag to obtain the content of messages transmitted therefrom. As noted above, one or more of those messages may contain a unique tag identifier. Use of messages containing a tag ID enables association of the message with a particular tag. Such is useful when it is necessary to combine information derived at different ones of RFID detectors 100, e.g., to determine the location of a tag. Other received tag messages, by virtue of the protocol employed, e.g., by their position in a sequence of tag messages, may be associated with a particular tag that has been identified, e.g., using a tag message containing the tag's tag ID. Other ways of recognizing which tag a message comes from so as to be able to associate various location parameters derived from messages from such tag may be employed. One such other method may be based on the time that a message is received from the tag. In other embodiments of the invention, information about which tag is being addressed, and from which a response is being received at an RFID detector 100, may be supplied to server 150 by RFID reader 110. For example, RFID reader 110 may indicate which tag has been singulated and that the tag messages are now coming from that tag. Alternatively, RFID reader 110 sends a time stamp and each of RFID detectors 100 sends a time stamp along with the position parameters and server 150 can then associate all the position parameters for the same time period indicated by the time stamps.

Various coding schemes and other configuration information may be employed by RFID tag 120 to construct one or more messages that it creates by backscattering. The configuration information may include a backscatter link frequency (BLF) and a coding scheme, e.g., FM0, or M order Miller coding, that is being employed. An RFID tag 120 typically receives in a message from RFID reader 110 instructions as to the configuration information, and in particular which coding scheme, to employ. In one embodiment of the invention, for a received tag message, processing circuit 230 could try each of the possible coding options until it determines the one that was used by RFID tag 120 to create the received tag message. In one embodiment of the invention, processing circuit 230, may decode a message that was transmitted by RFID reader 110, e.g., modulated on the CW RF signal, to obtain the configuration information. In another embodiment of the invention, processing circuit 230 may optionally be aided in the decoding through the use of configuration information supplied by the implementor where the supplied configuration information indicates any needed coding and configuration information. Such information may be supplied from server 150 to RFID detector 100 as part of configuration parameters received via network interface circuit 240.

Advantageously, as RFID detector 100 only requires an RFID receive path, it has no need for a high-power RFID transmitter such as is employed in a typical RFID reader. This not only substantially reduces the cost of RFID detector 100 by eliminating the high complexity of transmitting logic but it may also alleviate the need for bulky high-power RF circuitry and a power amplification integrate circuit (IC). Also, by eliminating the potential interference from the transmitting path to the receiving path that is associated with a typical RFID reader, the detector offers much better receiving sensitivity performance. The RFID detector 100 may be implemented by employing a miniaturized version of a typical RFID reader IC from which the transmitting circuitry is eliminated.

All of the circuitry for RFID detector 100 may be integrated into a system on chip (SoC). Antennas for RFID and BLE, as well as other miscellaneous elements, may be implemented in a low-profile form factor RFID detector, such RFID detector being is as slim as a credit card. A small integrated on-board battery or a small attached battery pack may be employed to power RFID detector 100 and such would be expected to be able to do so for long period of time.

Low cost, low power, and slim form-factor RFID detectors 100 are particularly advantageous when deploying multiple ones of RFID detectors 100. The use of multiple ones of RFID detectors 100 enable not only locating an object with an RFID tag attached to it but also enables accurately tracking the movements in space of such objects, e.g., as discussed further hereinbelow.

Figure 3:
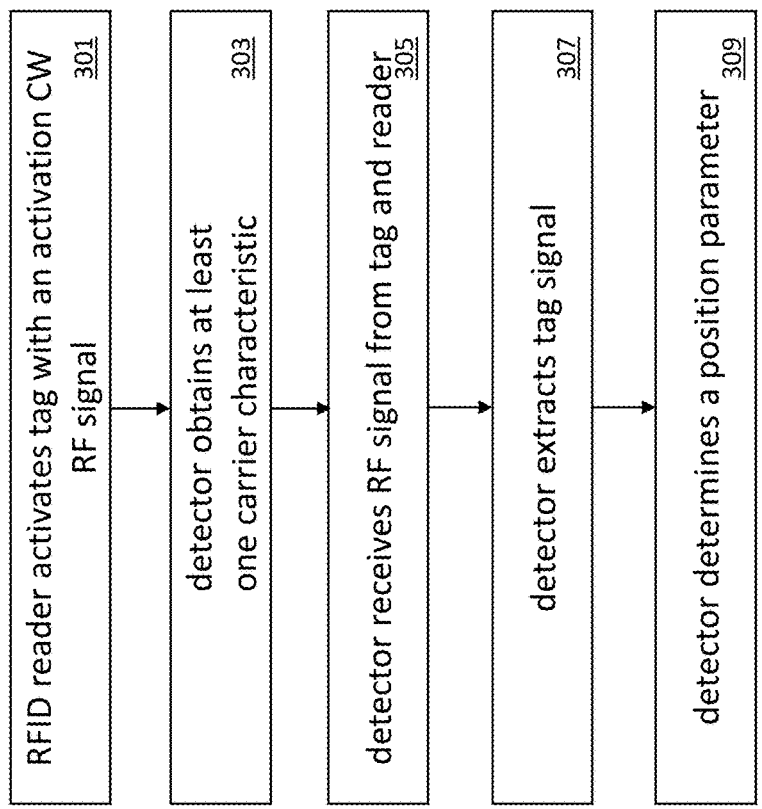
FIG. 3 is a flow chart of an illustrative method for determining a position parameter for an RFID tag in accordance with the principles of the invention.

FIG. 3 is a flow chart of an illustrative method for determining a position parameter for an RFID tag in accordance with the principles of the invention. The process is entered in step 301 in which an RFID reader 110 activates the RFID tag 120 transmitting a CW RF wave on a hopped-to carrier frequency in an RFID interrogation session. Prior to step 301 RFID reader 110 may step through interrogation procedures to singulate compatible RFID tags in the coverage area of RFID reader 110 one by one until the RFID tag is identified. In step 303, RFID detector 100 obtains an indication of a characteristic of the CW RF signal that is currently being used by the reader 110, e.g. as described hereinabove.

In step 305, RFID detector 100 receives a combined RF signal that includes an RF signal backscattered from the singulated RFID tag 120 in response to an interrogation signal and the activation RF signal that it received from the RFID reader. Next, in step 307, RFID detector 100 extracts the backscattered signal received from the singulated RFID tag 120, e.g., as described hereinabove.

Lastly, in step 309, detector 100 determines at least one position parameter based on the extracted RF signal backscattered from RFID tag 120.

Given the foregoing, each of RFID detectors 100 may associate a signal received from a tag with a particular RFID tag 120 based on receipt in a tag message of the unique tag identifier. The unknown position of RFID tag 120 can be ascertained based on the information determined from one or more tag messages. For example, when the positions of RFID detectors 100 are known, the location of a particular RFID tag, e.g., RFID tag 120-1, or location of a group of RFID tags 120, e.g., RFID tags 201-3 and 120-4, may be determined using a triangulation method. Such a triangulation may be based on respective estimates of the distance between 1) RFID tag 120 and reader 110 and 2) RFID tag 120 and each of the detectors 100. The distance estimate may be developed using the Friis transmission equation, sometimes referred to as the Friis Transmission Formula, using the RSSI that is determined based on the RF signal received from the tag. The distance estimate may also be developed using the RF phase rotation that is determined based on the RF signal received from the tag, e.g., as explained further hereinbelow.

To this end, the at last one position parameter may be transmitted from each of RFID detectors 100 to server 150 over one of communication channels 155. RFID reader 110 may also determine at least one position parameter and transmit it over one of communication channels 155 to server 150.

The determined information from the RFID detectors is stored in the server, and server 150 uses the information to ascertain a location of the RFID tag 120. Server 150 may be implemented in a variety of ways, as will be readily apparent to one of ordinary skill in the art. For example, in one embodiment of the invention, server 150 may be implemented as standalone hardware coupled to RFID detectors 100 and RFID reader 110 over communication channels 155. In another embodiment, although termed herein "server", server 150 may be implemented on a mobile or portable device that is coupled to the RFID detectors 100 over a personal area network, such as Bluetooth Low Energy (BLE).

Figure 4:
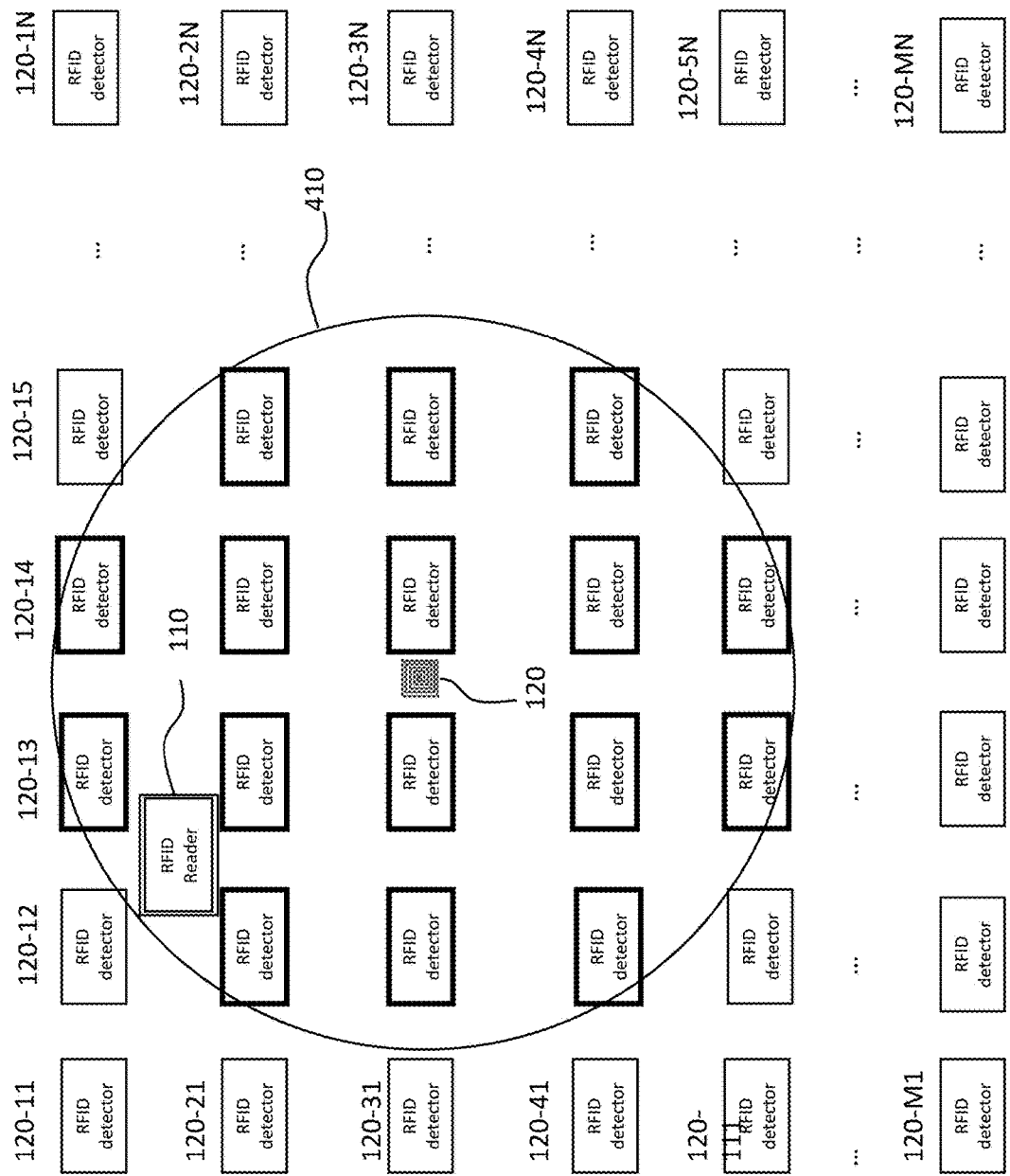
FIG. 4 shows an illustrative example to help explain the determination of a location of an RFID tags using position parameters obtained for the tag by one or more of RFID detectors.

FIG. 4 shows an illustrative example to help explain the determination of a location of one of RFID tags 120 using position parameters obtained for the tag by one or more of RFID detectors 100. RFID detectors 100 shown in FIG. 4 are of the same type as those shown in FIGS. 1 and 2 but are numbered somewhat differently to better indicate their number and their location across space. To this end, RFID detectors 100 in FIG. 4 are enumerated as RFID detectors 100-$ij$, where $1 \leq i \leq M$, $1 \leq j \leq N$ where M, N are integers equal to or greater than 1.

In this example, each of the highlighted RFID detectors 100, i.e., those whose outline is a thicker line, receives, in a current RFID interrogation session, a backscattered RF signal from RFID tag 120, which is possibly one of many RFID tags but is the only one shown in FIG. 4 for clarity. Typically, this is at a time after which the tag is singulated and so one-on-on communication is taking place between RFID reader 110 and RFID tag 120. Each non-highlighted RFID detector 100 effectively does not receive a signal from RFID tag 120 in the current RFID interrogation session.

Each of highlighted RFID detectors 100 determines at least one position parameter based at least on the version of the backscattered signal that it receives. Such determined position parameters may be transmitted to server 150 (FIG. 1). Each of highlighted RFID detectors 100 may also transmit information to identify, or that can be used to identify, that the transmitted position parameter is for the particular RFID tag 120. Doing so allows the at least one position parameter transmitted from one of RFID detectors 100 to be combined with one or more position parameters transmitted from others of RFID detectors 100, e.g., the highlighted ones of RFID detectors 100.

A range free technique, e.g., a technique in which a distance estimate is not made at RFID detectors 100, but which is instead based on whether or not multiple ones, and which particular ones, of RFID detectors 100 received a tag message from the subject RFID tag 120 may be used to accurately determine a location of RFID tag 120. In such an embodiment, the position parameter may be receipt of a valid signal. Server 150 knows the location of each of RFID detectors 100 and is informed by each of RFID detectors 100 which ones received a valid signal, e.g., the highlighted ones in FIG. 4. Based on such information, server 150 can determine an approximate location for RFID tag 120.

For example, the plurality of highlighted RFID detectors 100 may be located at various spatial points so as to form spatial pattern, e.g., symmetric spatial pattern 410, about RFID tag 120. Such a symmetrical spatial pattern as shown in FIG. 4 may result when perfect omni antennas are used by RFID detectors 100 and RFID tag 120. In one embodiment of the invention, geographical symmetric pattern 410 may be a circle with its center at the location of RFID tag 120. The geographical symmetric center, which corresponds to the location of RFID tag 120, may be determined with maximum likelihood, Kalman filtering, or other optimization techniques. As such, by relying on receipt of a valid signal, i.e., a signal of sufficient strength, the location of RFID tag 120 may be determined. In other embodiments of the invention. the spatial pattern formed may be different, e.g., it may be a function of the nature of the antennas employed, but knowing the nature of the pattern that results will allow one of ordinary skill in the art to determine the location of RFID tag 120.

An improved accuracy of the determined location may be achieved by making use of RSSI as determined at RFID detectors 100 that receive a valid signal. As noted above, RSSI may be employed as the position parameter determined by RFID detectors 100. As will be appreciated by those of ordinary skill in the art, according to the Friis equation, the RSSI for any tag message from tag 120, as measured at each of RFID detectors 100 that receives the message, e.g., the highlighted ones of RFID detectors 100 in FIG. 4, is inversely proportional to the distance in free space squared between tag 120 and the particular detector 100.

Figure 5:
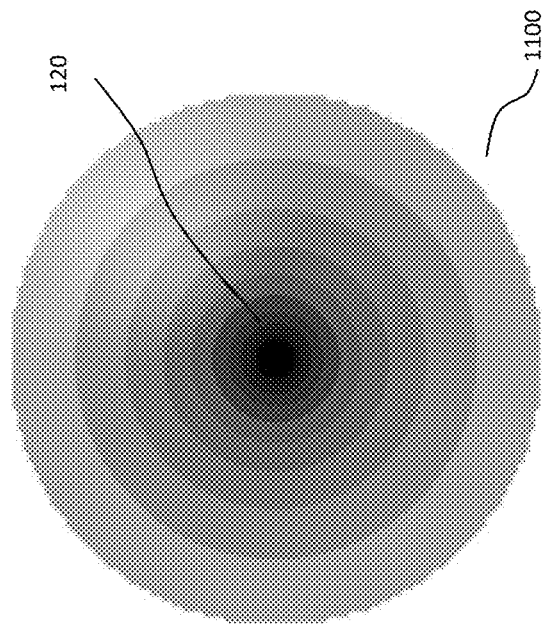
FIG. 5 shows an illustrative spatial intensity distribution function.

The RSSI determined at the various spatial points at which RFID detectors 100 are located and receive a valid signal may be employed as a weighting function to an assumed symmetric spatial intensity distribution function, e.g., spatial intensity distribution function 500 shown in FIG. 5. For example, for perfect omni antennas, as discussed above, the assumed geographical symmetric pattern may be a circle. The symmetric center of the symmetric spatial intensity distribution function 500 is the location of the RFID tag 120. The symmetric center may be determined with maximum likelihood, Kalman filtering, or other optimization techniques, as will be readily apparent to those of ordinary skill in the art.

Figure 6:
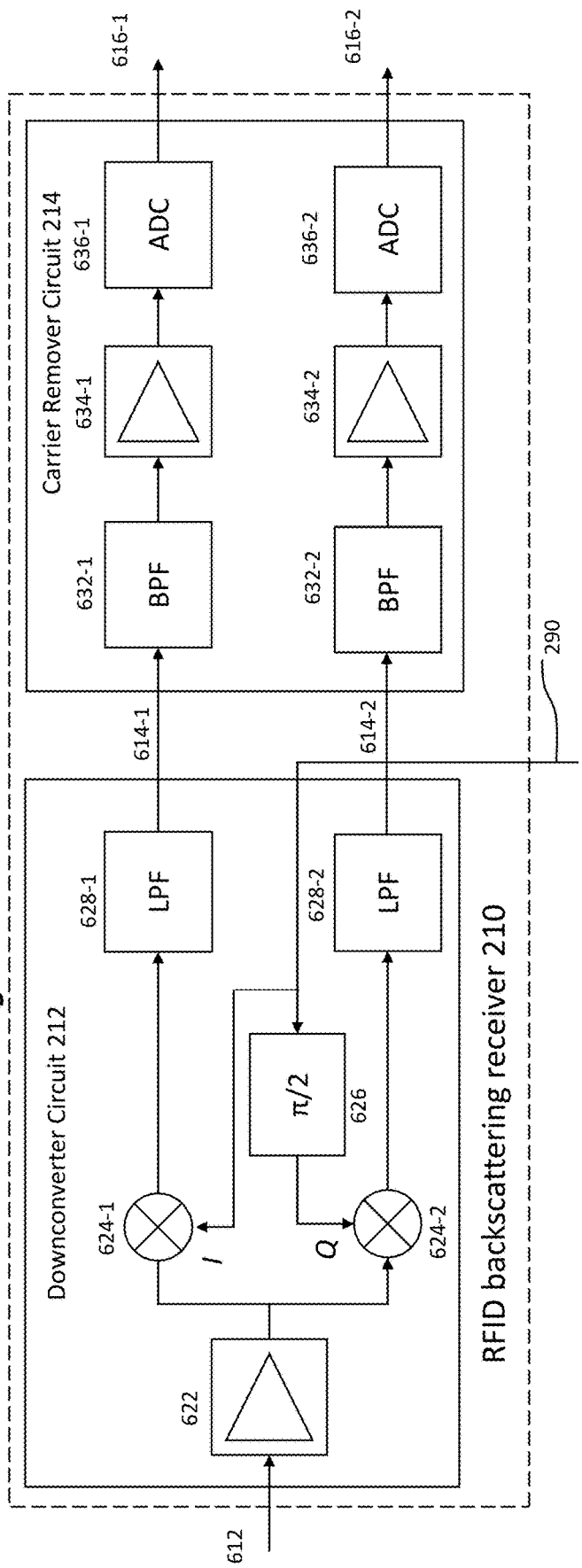
FIG. 6 shows another illustrative embodiment of an RFID backscattering receiver for use in an RFID detector of FIG. 1, in accordance with the principles of the invention.

In accordance with an aspect of the invention, the location of RFID tag 120 may be approximated by the location of a one of RFID detectors 100, using an assessment of proximity of RFID tag 120 to the one of RFID detectors 100. In one embodiment of the invention, proximity of an RFID tag 120 to one of RFID detectors 100 is determined based on a receipt of a valid backscattered signal from RFID tag 120 by only the one of RFID detectors 100. In another embodiment of the invention, proximity of an RFID tag 120 to one of RFID detectors 100 is determined based on which of RFID detectors 100 receives a backscattered signal from the RFID tag that has the strongest RSSI among all of the RFID detectors receiving a valid backscattered signal from the RFID tag 120. FIG. 6 shows another illustrative embodiment of RFID backscattering receiver 210 for use in one of RFID detectors 100 (FIG. 1) operating in a passive RFID mode in an environment employing FHSS, in accordance with the principles of the invention.

In the embodiment shown in FIG. 6, downconverter circuit 212 may be implemented as a direct conversion quadrature demodulator. In such an embodiment the received RF signal is directly downconverted to baseband, rather than to an intermediate frequency (IF) as may be done in the embodiment of FIG. 2. In FIG. 6 downconverter circuit 212 includes a) RF amplifier 622; b) quadrature mixers 624, which includes quadrature mixers 624-1 and 624-2; c) π/2 phase shifter 626; and d) low pass filters (LPF) 628-1 and 628-2, collectively low pass filters 628, arranged in the manner shown. In the embodiment of FIG. 6, carrier remover circuit 214 may include a) band pass filters (BPF) 632-1 and 632-2, collectively band pass filters 632; b) variable gain amplifiers (VGA) 634-1 and 634-2, collectively, variable gain amplifiers 634; and analog to digital converters (ADC) 636-1 and 636-2, collectively analog to digital converters 636. BPFs 632 remove components of the activating CW RF signal from reader 110 (FIG. 1) that become direct current (DC) signals at the output of direct conversion demodulator 212. Each respective one of LPFs 628 may optionally be implemented as a single unit with the corresponding one of BPF 632 to which it is coupled.

A combined RF signal F(t) received at input 612, e.g., via antenna 270 (FIG. 2) of RFID backscattering receiver 210 may be expressed as a sum of backscattered signal from tag 120 and the CW RF signal from reader 110. The received combined backscattered RF signal at carrier regenerating circuit 220 from RFID tag 120 and CW RF signal from RFID reader 110 may be expressed as:

$$F(t)=\alpha(t)\cos(2\pi ft-\phi)+A\cos(2\pi ft-\varphi)$$

where f denotes the carrier frequency of the CW RF signal from reader 110; α(t) is the received tag signal; ϕ is the total phase rotation of the CW RF signal traversing from an antenna (not shown) of RFID reader 110 (FIG. 1) that is backscattered by RFID tag 120 (FIG. 1) and arrives at downconverter circuit 212; and φ is the total phase rotation of the CW RF signal traversing from an antenna (not shown) of RFID reader 110 that arrived at RFID backscattering receiver 210.

In one embodiment of the invention, carrier regenerating circuit 220 (FIG. 2) is implemented as a frequency synthesizer that synthesizes a carrier having a frequency based on the obtained indication of at least one characteristic of the CW RF signal used for activating an RFID tag, where the at least one characteristic is the frequency of the activating CW RF signal obtained by detector 100. The regenerated CW RF signal at output 290 of carrier regenerating circuit 220 may be expressed as:

$$S(t)=\alpha \cos(2\pi ft-\varphi')$$

where φ' is an arbitrary phase and a is the amplitude of the regenerated carrier produced by carrier generating circuit 220 that is applied to downconverter circuit 212, e.g., in FIG. 6. Therefore, the quadrature components at outputs 614-1 and 614-2 may be expressed, respectively, as:

$$G_I = \frac{A\alpha K}{2}\cos(\varphi - \varphi') + \frac{\alpha K}{2}\alpha(t)\cos(\Phi - \varphi')$$

and $$G_Q = \frac{A\alpha K}{2}\sin(\varphi - \varphi') + \frac{\alpha K}{2}\alpha(t)\sin(\Phi - \varphi')$$

where K is the total gain of downconverter circuit 212. The DC terms in the in-phase and quadrature components, removed by BPF 632, are the downconverted CW RF signal from reader 110 with gain K.

The digitized in-phase and quadrature-phase components at outputs 616-1 and 616-2, respectively, of the backscattering receiver 210 of FIG. 6 may be expressed as:

$$H_I = \frac{\alpha G}{2}a(t)\cos(\Phi - \varphi')$$

and $$H_Q = \frac{\alpha G}{2}a(t)\sin(\Phi - \varphi')$$

where G is the total gain of receiver 210.

RSSI may be determined when RFID backscattering receiver 210 has an input impedance R as:

$$P = \frac{1}{2}\frac{\overline{(a(t))^2}}{R} = \frac{1}{2}\overline{H_I^2+H_Q^2} \Big/ R\left(\frac{\alpha G}{2}\right)^2$$

where the average operation is over a period of a backscattered RF signal that is carrying a message from a singulated RFID tag 120.

Figure 7:
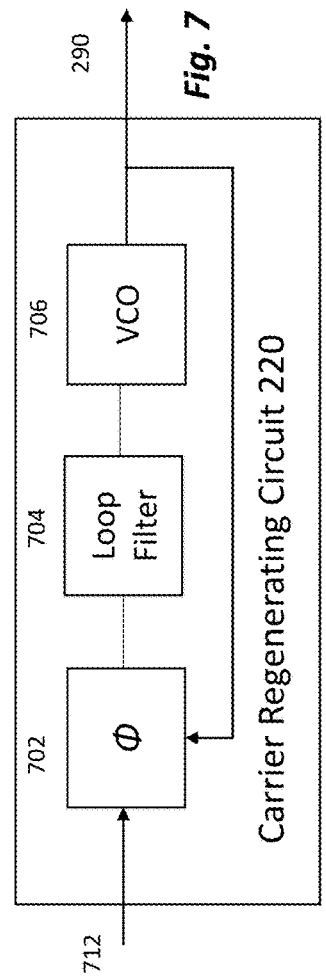
FIG. 7 shows an illustrative embodiment of a carrier regenerating circuit implemented as a phase lock loop.

FIG. 7 shows an illustrative embodiment of carrier regenerating circuit 220 implemented as a phase lock loop (PLL). This embodiment is based on receipt of the CW RF signal from reader 110, which is received at input 712 of carrier regenerating circuit 220. Shown in FIG. 7 are phase comparator 702, loop filter 704, and voltage-controlled oscillator (VCO) 706.

PLL-implemented carrier regenerating circuit 220 supplies at output 290 a regenerated carrier signal that is synchronized to the CW RF signal that is transmitted from RFID reader 100. Such a regenerated carrier signal S(t) may be expressed as:

$$S(t)=\alpha \cos(2\pi ft-\varphi)$$

The digitized in-phase and quadrature-phase components at outputs 616-1 and 616-2 of backscattering receiver 210 (FIG. 6), respectively may then be expressed as:

$$H_I = \frac{\alpha G}{2}a(t)\cos(\Phi - \varphi')$$

and $$H_Q = \frac{\alpha G}{2}a(t)\sin(\Phi - \varphi')$$

The total phase rotation ϕ may be obtained by dividing the quadrature component by the in-phase component, at outputs 616-1 and 616-2, respectively, of the RFID backscattering receiver 210 (FIG. 6), e.g.:

$$\Phi = \arctan\left(\frac{H_Q}{H_I}\right) + \varphi$$

Figure 8:
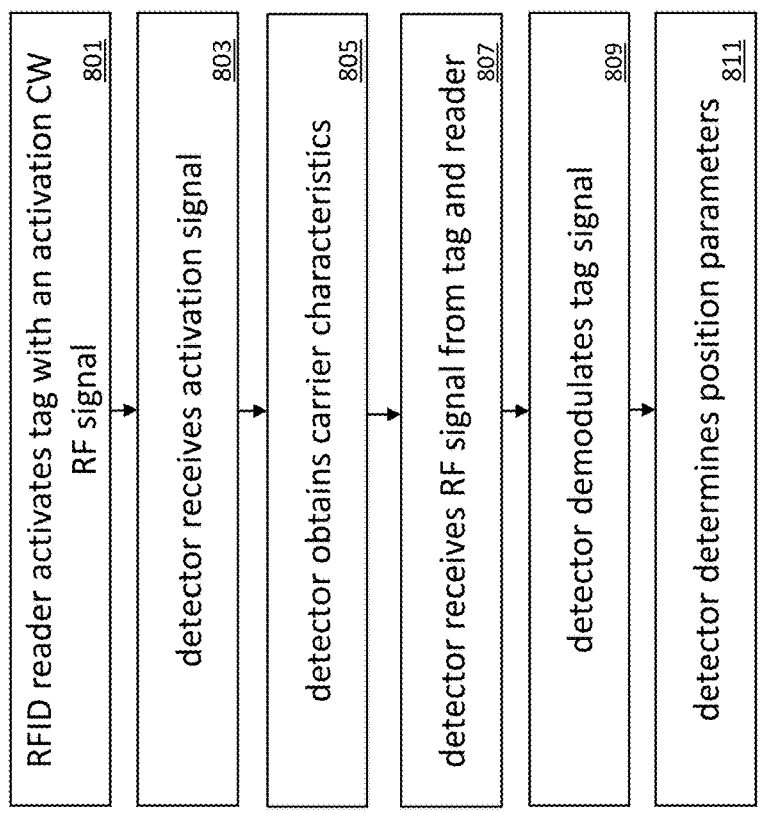
FIG. 8 is a flow chart of another illustrative method for determining position parameter in accordance with the principles of the invention.

FIG. 8 is a flow chart of another illustrative method for determining a position parameter in accordance with the principles of the invention. The process is entered in step 801 in which RFID reader 110 activates RFID tag 120 using an activating CW RF signal in an RFID interrogation session. Prior to step 810, RFID reader 110 may step through interrogation procedures to singulate compatible RFID tags in the coverage area of RFID reader 110 one by one until the RFID tag is singulated and so may be engaged in one-to-one communication with RFID reader 110. Next, in step 803, RFID detector 100 receives the CW RF signal.

RFID detector 100 obtains at least one of the characteristic of the CW RF signal that was transmitted by RFID reader 110, in step 805. In one embodiment of the invention, the at least one characteristic may be obtained by determining it from the CW RF signal transmitted by RFID reader 110 and received by RFID detector 100.

Thereafter, in step 807, RFID detector 100 receives a combined RF signal, e.g., via antenna 270, that includes an RF signal backscattered from the singulated one of RFID tags 120, which was sent in response to the CW RF signal and an interrogation signal received by the singulated RFID tag 120 from RFID reader 110. Typically the magnitude of the CW RF signal transmitted by RFID reader 110 is much greater than that of the backscattered signal received from RFID tag 120. Next, in step 809, RFID detector 100 demodulates the backscattered signal from RFID tag 120 based on a regenerated carrier which is developed based on the obtained characteristics of the activating signal from the reader 110.

In view of the foregoing, in an RFID system that uses frequency hopping for the CW RF signal that is transmitted from RFID reader 110 to RFID tag 120, the backscattered signal from RFID tag 120 is detected by RFID detector 100 based on at least one characteristic of the CW RF signal that was obtained.

Lastly, in step 811, RFID detector 100 determines at least one position parameter from the demodulated RF signal backscattered from RFID tag 120. The position parameters may be one of 1) RSSI, 2) a time stamp, 3) an RF phase rotation, and 4) detection of a valid signal.

Figure 9:
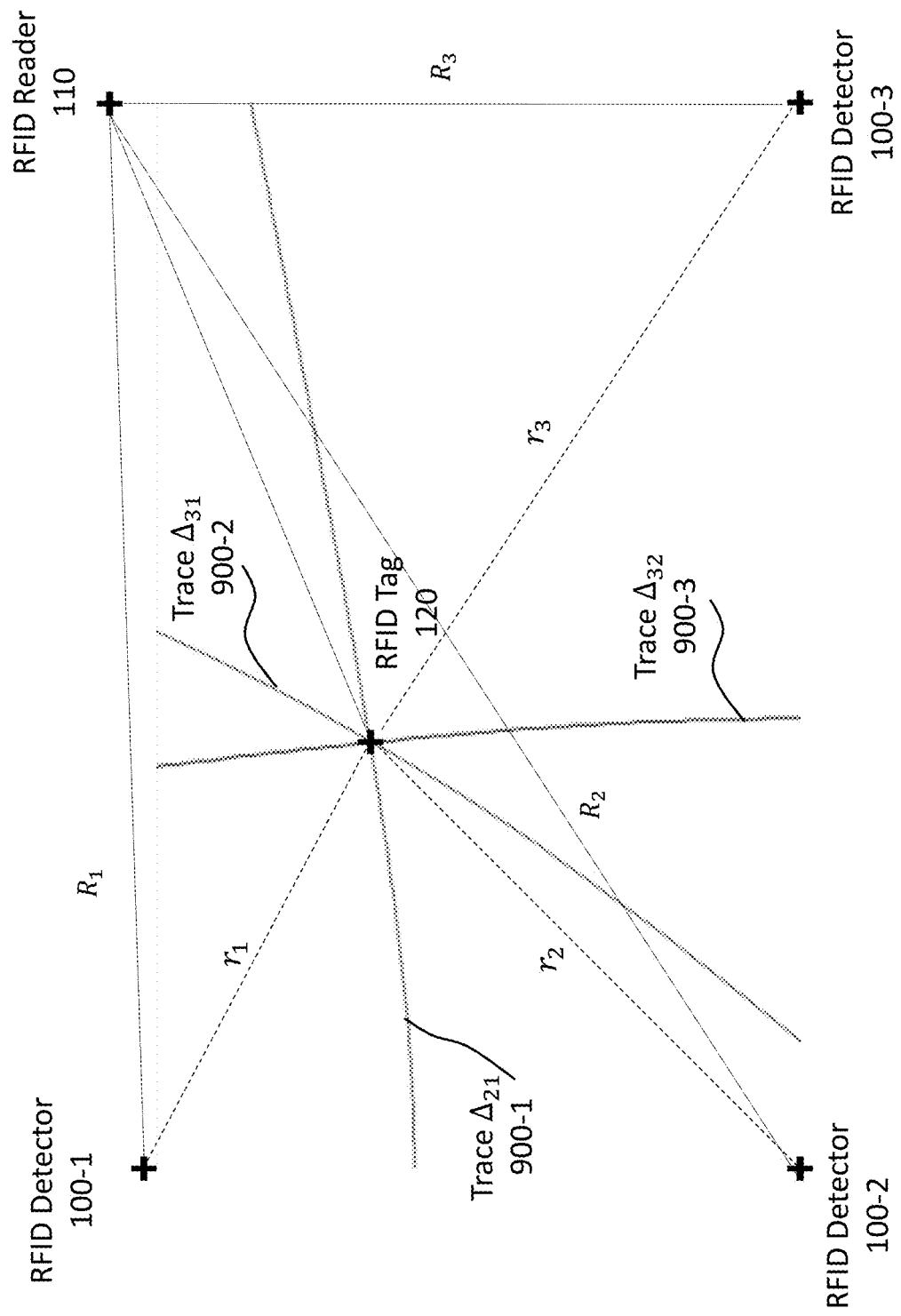
FIG. 9 shows an illustrative example to help explain a method for locating a group of RFID tags, in accordance with an embodiment of the invention.

FIG. 9 shows an illustrative example to help explain a method for locating a group of RFID tags 120, in accordance with an embodiment of the invention. FIG. 9 indicates the locations of each of RFID detectors 100-1, 100-2, 100-3, RFID reader 110, and RFID tag 120 with respective crosses.

The total RF phase rotation $\phi_i$ of a backscattered RF signal from tag 120 and received by a one of RFID detectors 100-$i$, where i={1,2,3}, may be calculated as:

$$\phi_i = \varphi_0 + \theta_i + \phi_T + \phi_D$$

where $\varphi_0$ is the phase rotation of the activating CW RF signal from the antenna of reader 110 to tag 120; $\theta_i$ is the phase rotation of the backscattered signal from tag 120 as received at locator 100-I; $\phi_T$ is the phase rotation caused by tag 120; and $\phi_D$ is the phase rotation caused at antenna 270 and by any other optional RF components before receipt at backscatter receiver 210 of detector 100. A phase difference $\Delta\phi_{i,j}$, where i,j={1,2,3} and j is different from i, may be calculated as:

$$\Delta\Phi_{ij} = \Phi_i - \Phi_j = \theta_i - \theta_j = \frac{2\pi f(r_i - r_j)}{c}$$

where $r_i$ is the distance between RFID detector 100-$i$ and RFID tag 120 and c is the speed of the light. Therefore, the difference of distances may be calculated as:

$$\Delta_{ij} = r_i - r_j = \frac{\Delta\Phi_{ij} c}{2\pi f} = \frac{\Delta\Phi_{ij} \lambda}{2\pi}$$

where λ is the wavelength of the activating CW RF signal.

A trace 900-$k$, k ={1,2,3 }, for each pair of $\Delta_{ij}$, where i,j, ={1,2,3} and i≠j, may be determined analytically or computationally as a simple curve. In the example of FIG. 9, three of the traces 900-1, 900-2 and 900-3 intersect at the location of RFID tag 120.

In one embodiment of the invention, RFID reader 110 (FIG. 1) repeats tag sessions at certain time intervals, e.g., as instructed by server 150, thereby enabling determination of RFID tag information at different time instances. The determined location information at several time instances may result in multiple corresponding location estimates, one for each time instance. If an RFID tag 120 is stationary, the location estimate for that tag will not change with time. However, when the RFID tag is moving, its location will likely be different at each time instance. In one embodiment of the invention, the changing location information may be used to determine the rate of movement and direction of movement of RFID tag 120.

The rate of movement, or the velocity, may be obtained by employing the location determined at two-time instances, e.g., a current and a previous time instance. The velocity may be obtained, for example, from the distance between a current time instance position and a previous time instance position divided by the elapsed time between the precious and current time. The direction of the movement may be obtained from the direction of the vector going from the position at the previous time instance to the position at the current time instance.

In one embodiment of the location, location information may be stored so that the movement of RFID tags 120 over time may be analyzed. For example, server 150 may store in memory the various positions of one or more RFID tags 120. Such a method can be used, for example, to research movement patterns of items with attached RFID tags 120 or to track the paths traveled by lost or stolen items with attached RFID tags 120.

Figure 10:
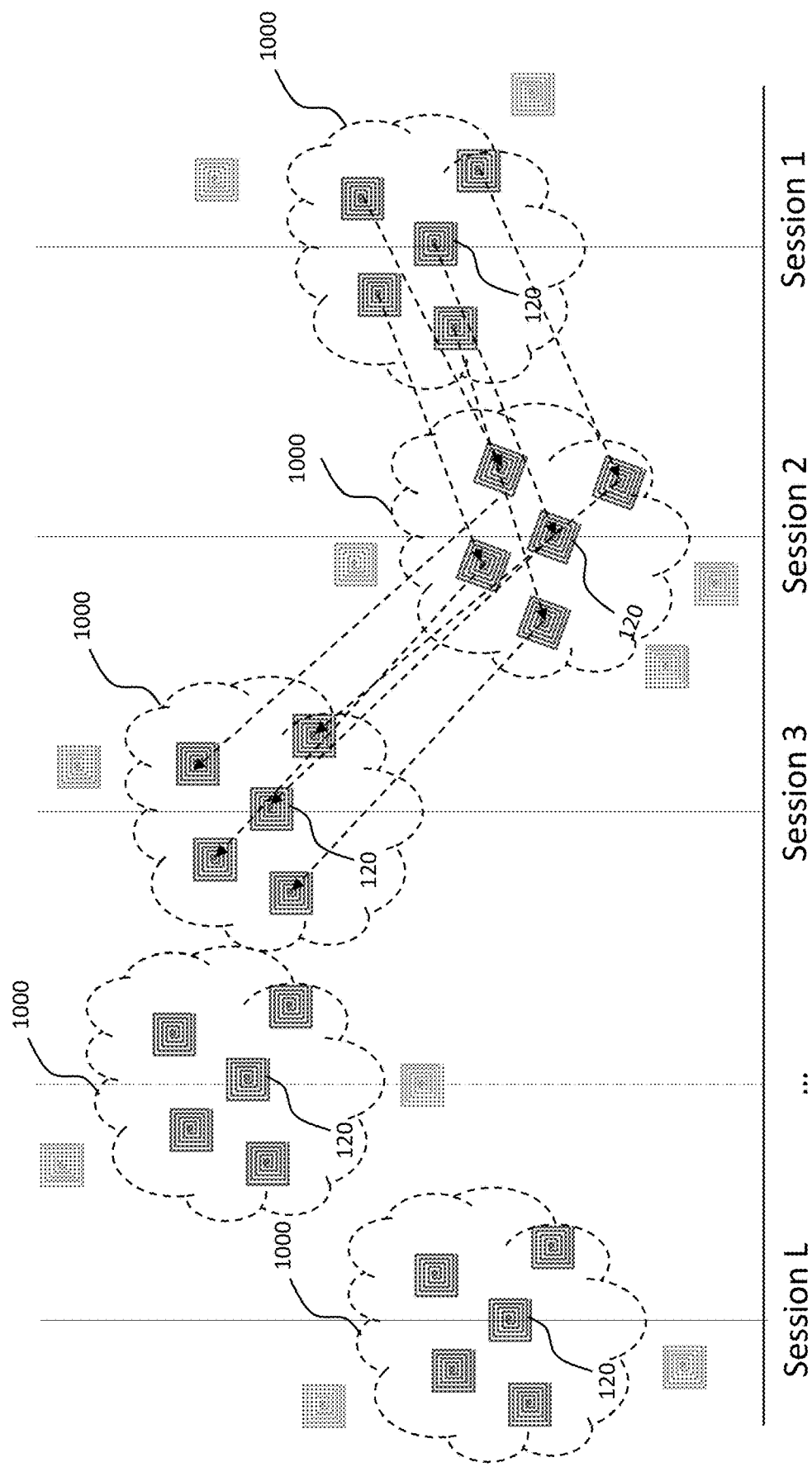
FIG. 10 shows an illustrative example related to determining that a plurality of RFID tags are associated together, e.g., in a group of RFID tags, in accordance with an embodiment of the invention.

FIG. 10 shows an illustrative example related to determining that a plurality of RFID tags are associated together, e.g., in a group of RFID tags 120, in accordance with an embodiment of the invention. A location, a direction of movement, a speed of movement, or a combination of several aforementioned items for each individual RFID tag 120 is determined by using time stamps that are associated on server 150 (FIG. 1) with measured position parameters captured by the RFID detectors 100 (FIG. 1) during each of multiple interrogation sessions, e.g., Session 1, Session 2, through Session L, where L is an integer typically equal to or greater 1, which occur at different times, and where increasing values of L indicate later times. Also, typically, the more sessions that are employed, the more accurate the results will be. Server 150 may determines a pattern of the movement over time for each of the RFID tags 120 based on the various locations determined for each RFID tag 120 at the time of each session. A similarity in movement pattern over the time interval of the multiple sessions, and/or the proximity of locations of ones of tags 120, indicates that such RFID tags 120 appear to belong to a group, e.g., group 1000.

Tracking of groups of RFID tags 120 is particularly useful for automatic transactions in a library or a department store in that a group of objects that are being checked out or bought by a user, where a passive RFID tag 120 is attached to each respective object, may be associated together. As an example, RFID reader 110 and RFID detectors 100 may be installed along a hallway of a facility, such as a library or a department store, the hallway leading to the main entrance and exit, as well as throughout the facility. The similarity in movement pattern and the close proximity of the group of RFID tags 120 to each other at each time instance may indicate an association of the group of objects. Such an associate may be determined using a well-known intelligent algorithm with pre-defined criteria. If one of the tags is associated with a person, then when the person is determined to pass the exit together with the objects, the objects are all associated as checked out or sold to the person.

RSSI measurements at an RFID detector 100 may have a dependency on the distance between RFID reader 110 and RFID tag 120 since an RFID tag backscatters the CW signal from RFID reader 110, and the strength of the CW signal at RFID tag 120 depends on its distance from RFID reader 110. To improve location determinations that would otherwise be less accurate as a result of using such location-dependent RSSI measurements in their calculation, a normalization process can be performed to compensate for the distance between RFID reader 110 and RFID tag 120.

A simplified calculation for performing normalization is possible in an embodiment of the invention in which RFID reader 110, RFID detectors 100, and RFID tags 120 employ omnidirectional antennas and have line-of-sight between each element. In such an embodiment, the received power at RFID tag 120 may be expressed using the Friis equation as:

$$P^{RX}_{tag} = \frac{P^{TX}_{interrogator} G_{interrogator} G_{tag} \lambda^2}{(4\pi)^2 D^2}$$

where P denotes power, G is antenna gain, λ is the wavelength of the activating CW RF signal, and D is the distance between the tag and the reader. The received signal strength of the back-scattered signal at the reader is expressed as:

$$P^{RX}_{interrogator} = \frac{P^{TX}_{tag} L G_{interrogator} G_{tag} \lambda^2}{(4\pi)^2 D^2} = \frac{P^{TX}_{interrogator} L G^2_{interrogator} G^2_{tag} \lambda^4}{(4\pi)^4 D^4}$$

where L denotes a tag back-scattering loss ratio. The RSSI of the back-scattered signal at an RFID detector 100 may be expressed as:

$$P^{RX}_{receiver} = \frac{P^{TX}_{tag} L G_{receiver} G_{tag} \lambda^2}{(4\pi)^2 D^2} = \frac{P^{TX}_{interrogator} L G_{interrogator} G_{receiver} G^2_{tag} \lambda^4}{(4\pi)^4 D^2 d^2}$$

The normalized received signal strength is expressed as if an RFID tag 120 is hypothetically energized by RFID detector 100 with the same transmitted power as was transmitted by the reader, thus being, e.g.:

$$\hat{P}^{RX}_{receiver} = \frac{P^{TX}_{interrogator} L G^2_{receiver} G^2_{tag} \lambda^4}{(4\pi)^4 D^4} = \frac{(P^{RX}_{receiver})^2}{\hat{P}^{RX}_{interrogator}}$$

One skilled in the art will be readily able to apply other normalization algorithms for other arrangements in which there are specified particular antenna configurations for RFID reader 110, RFID detectors 100, and RFID tags 120.

Figure 11:
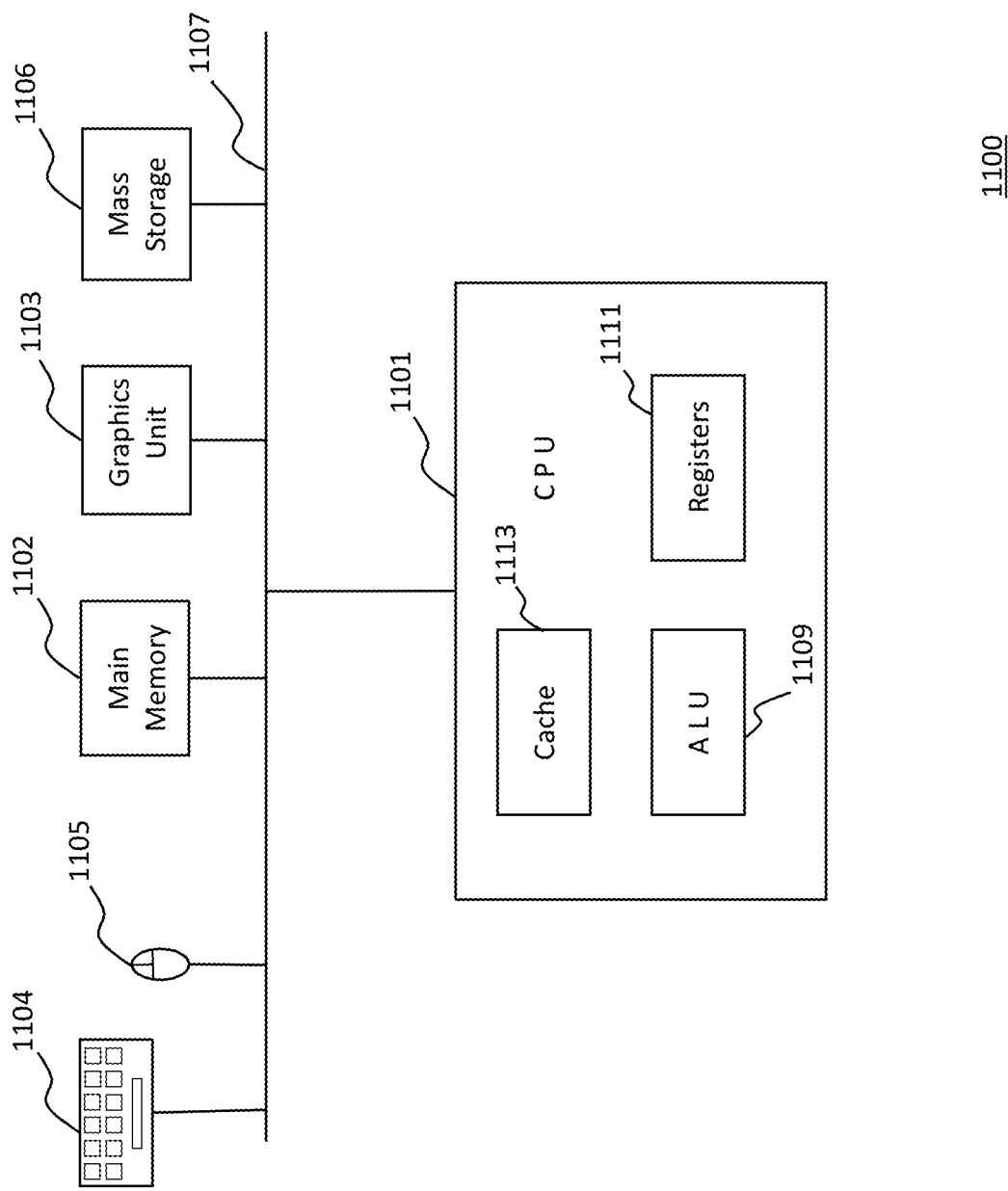
FIG. 11 shows an illustrative computer system which may be used to implement various components of the illustrative system shown in FIG. 1.

Turning for a moment to FIG. 11, and keeping in mind that the present invention may advantageously be implemented on nearly any conventional computer system with suitable input and output circuitry, FIG. 11 shows an illustrative computer system 1100 which may be used to implement server 150 (FIG. 1). In addition, the general architecture of such a computer system may be used to implement RFID detector 100, RFID reader 110, and RFID tag 120. However, in such cases, the details will vary based on the particular use, e.g., some of the input and output systems of FIG. 11, such as keyboard, mouse, and display may be excluded, while other input and output systems may be added, e.g., circuitry to implement wireless communication.

System 1100 includes a) central processing unit (CPU) 1101; b) main memory 1102; c) graphics unit 1103; d) keyboard 1104 for user input; e) mouse 1105; and f) mass storage 1106, also known as long term storage, which may include both fixed and removable media using any one or more of solid state, magnetic, optical or magnetoptical storage technology, or any other available mass storage technology. These components may be interconnected via conventional interconnection methods, which may include other integrated circuits and controllers, e.g., so called "north bridges" and "south bridges", as well as PCI, PCI-X, AGP, and PCIe interfaces, but which for convenience and pedagogical purposes are simplified as simply bi-directional system bus 1107. Bus 1107 contains address lines for addressing any portion of memory 1102. System bus 1107 also includes a data bus for transferring data between and among a) CPU 1101, b) main memory 1102, c) graphics unit 1103, and d) mass storage 1106.

In the illustrative embodiment shown, CPU 1101, which may be a single core or multicore processing unit, contains arithmetic logic unit (ALU) 1109, registers 1111, and cache 1113 among other components conventionally found in central processing units. ALU 1109, registers 1111, and cache 1113 may be individual units, e.g., in a single core processor, or they may have portions that are part of each core and are just represented here collectively. CPU 1101 may be any suitable microprocessor.

Main memory 1102 of system 1100 may be, for example, 16 gigabytes of conventional dynamic random access memory, although more or less memory may suitably be used.

Graphics unit 1103 may be a graphics card such as is available from AMD or nVidia or may include built in graphics provided as part of CPU 1101. Graphics unit 1103 may include video random access memory, e.g., 1 gigabyte thereof. Again, depending on the resolution desired, more or less such memory may be used. The video random access memory may be a shared portion of, or part of, main memory 1102. Graphics unit 1103 converts information for display on a conventional video monitor (not shown) that is suitable for displaying graphic images using one of the conventionally available interfaces such as VGA, HDMI, and display port.

Figure 12:
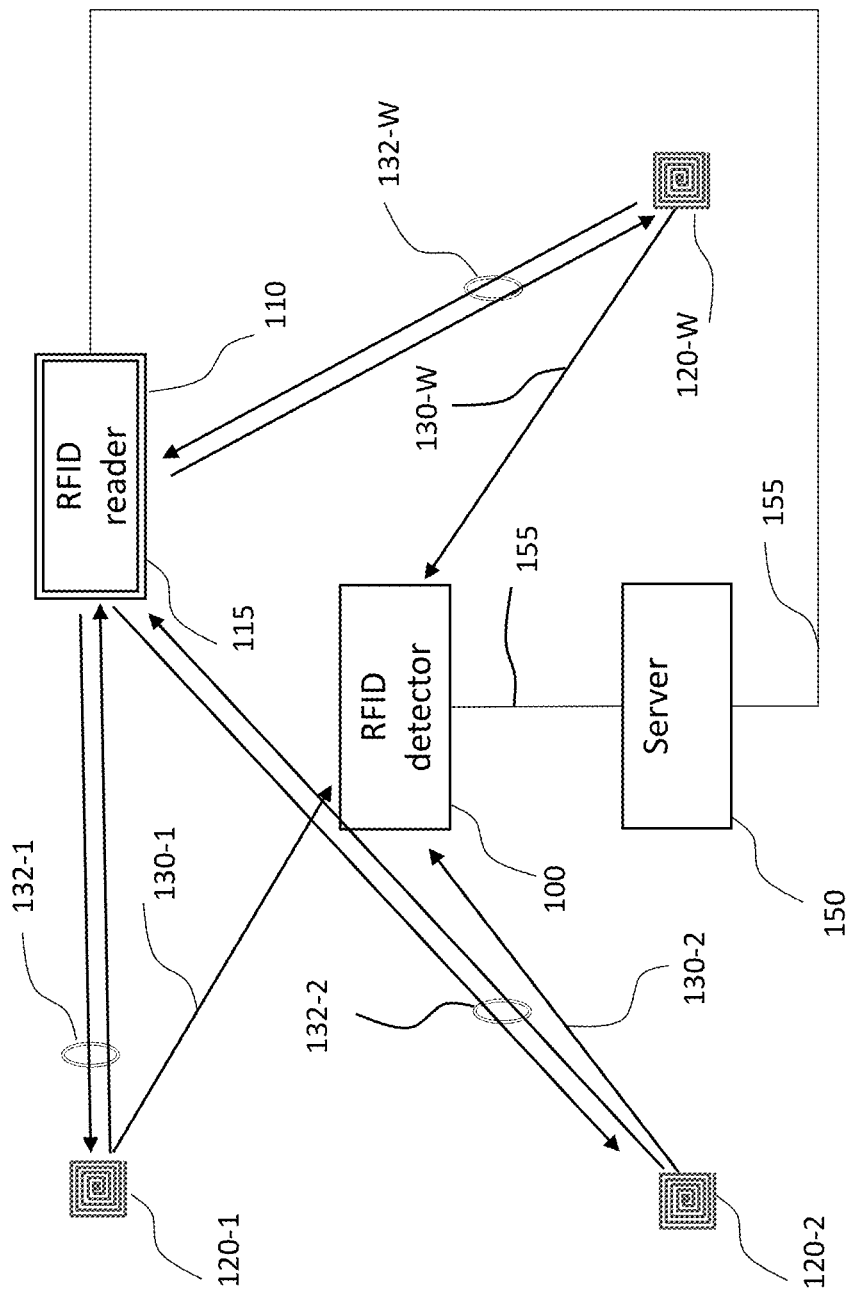
FIG. 12 shows another illustrative RFID location system arranged in accordance with the principles of the invention.

FIG. 12 shows an illustrative RFID location system 20 arranged in accordance with the principles of the invention.

RFID location system 20 includes a conventional RFID reader 110, conventional RFID tags 120-1 through 120-W, where W is an integer equal to or greater than 1, referred to herein collectively as RFID tags 120. RFID location system 20 also includes an RFID detector 100, which are arranged to implement the principles of the invention. RFID location system 20 may be used to ascertain the location of, i.e., locate, RFID detector 100.

RFID reader 110 interrogates and singulates each of RFID tags 120 that are within its range during each interrogation session. When only a particular one of RFIDs 120 tag is responding, e.g., because it has been singulated, its response may be received by RFID detector 100. RFID detector 100 may associate a signal received from each of the singulated tags 120 based on receipt in a tag message of the unique tag identifier. The unknown position of RFID detector 100 can be ascertained based on the information determined from one or more tag messages of each of singulated tags 120. For example, when the positions of RFID tags 120 are known, the location of the RFID detector 100 may be determined using a triangulation method. To this end, the at last one position parameter from each of the singulated RFID tags 120 may be transmitted from the RFID detector 100 to server 150 over one of communication channels 155. The determined information from the RFID tags 120 is stored in server 150, and server 150 uses the information to ascertain a location of RFID detector 100.

Figure 13:
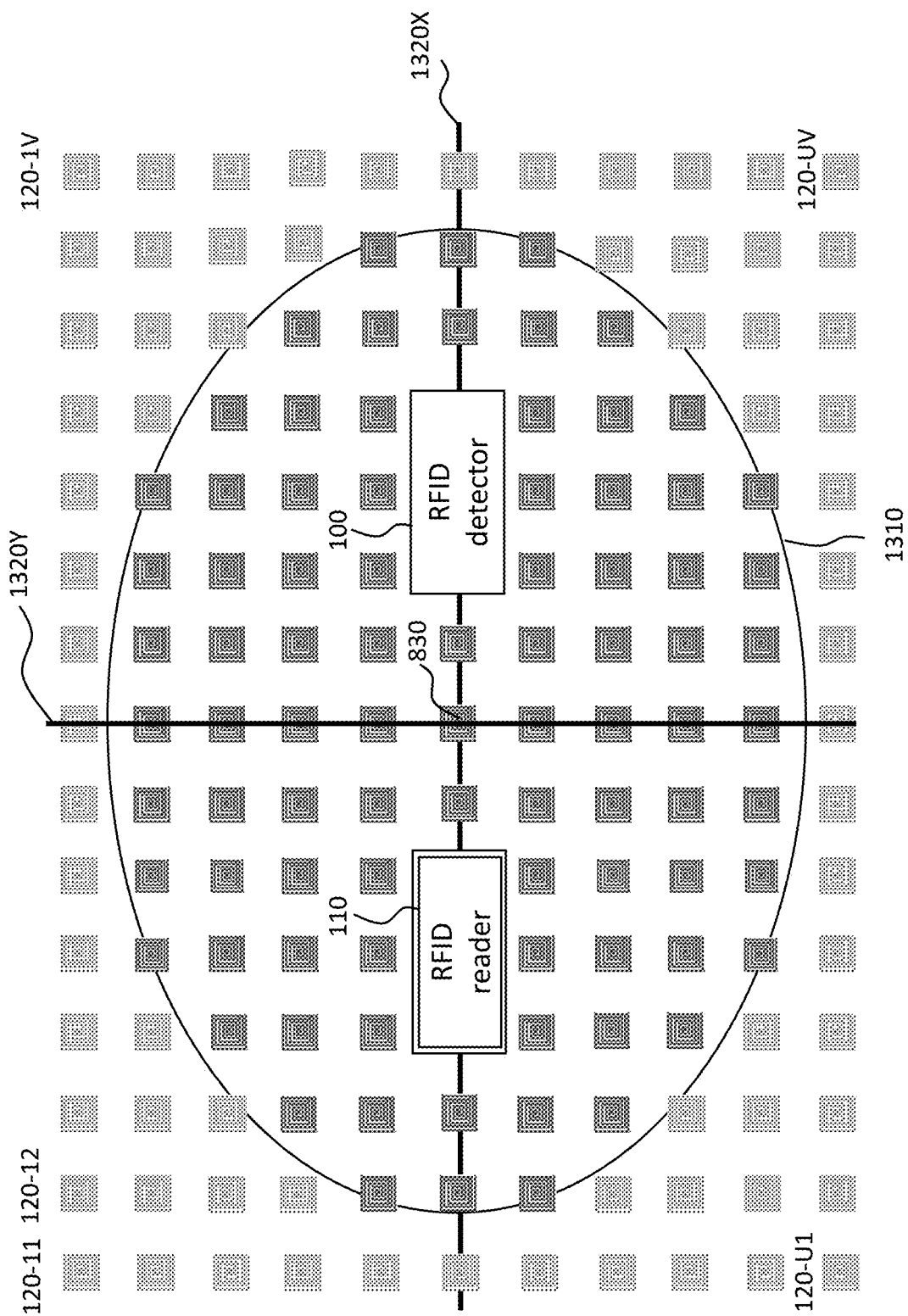
FIG. 13 shows an illustrative example for determination of a location of an RFID detector using position parameters obtained by the RFID detector from one or more of RFID tags.

FIG. 13 shows an illustrative example for determination of a location of an RFID detector 100 using position parameters obtained by RFID detector 100 from one or more of RFID tags 120. RFID tags 120 in FIG. 13 are enumerated as RFID tags 120-$ij$, where $1 \le i \le U$, $1 \le j \le V$ and U, V are integers equal to or greater than 1. In this example, RFID detector 100 receives a backscattered RF signal from each of the highlighted RFID tags 120, in a current RFID interrogation session. Typically, each of highlighted RFID tags 120 is singulated and so one-on-on communication may take place between RFID reader 110 and RFID tag 120. RFID detector 100 effectively does not receive a signal from each non-highlighted RFID tag 120 in the current RFID interrogation session.

RFID detector 100 determines at least one position parameter based at least on the version of the backscattered signal that it receives from each of highlighted RFID tags 120, e.g., as described hereinabove. Such determined position parameters may be transmitted to server 150 (FIG. 1).

A range free technique may be used to accurately determine a location of the RFID detector 100. In such an embodiment, the position parameter may be receipt of a valid signal. Server 150 knows the location of each of RFID tags 120 and is informed by RFID detector 100 which of RFID tags 120 sent a valid signal that was received by RFID detector 100, e.g., the highlighted ones in FIG. 13. Based on such information, server 150 can determine an approximate location for RFID detector 100.

For example, the plurality of highlighted RFID tags 120 may be located at various spatial points so as to form a spatial pattern, e.g., symmetric spatial pattern 1310, about RFID locator 100. Such a symmetrical spatial pattern as shown in FIG. 13 may result when perfect omni antennas are used by RFID detector 100 and RFID tags 120. In one embodiment of the invention, geographical symmetric pattern 1310 may be an ellipse with its foci at the locations of RFID detector 100 and RFID reader 110 respectively. The unknown focus of the ellipse 1310, which corresponds to the location of RFID tag 120, may be determined by using maximum likelihood, Kalman filtering, or other optimization techniques, as will be readily apparent to those of ordinary skill in the art. As such, by relying on receipt of a valid signal, i.e., a signal of sufficient strength, the location of RFID detector 100 may be determined. In other embodiments of the invention. the spatial pattern formed may be different, e.g., it may be a function of the nature of the antennas employed, but knowing the nature of the pattern that results will allow one of ordinary skill in the art to determine the location of RFID detector 100.

An improved accuracy of the determined location may be achieved by making use of RSSI as determined by RFID detector 100 for RFID tags 120 that sent a valid signal. As noted above, RSSI may be employed as the position parameter determined by RFID detector 100. As will be appreciated by those of ordinary skill in the art, according to the Friis equation, the RSSI for any tag message from RFID tags 120, e.g., the highlighted ones of RFID detectors 100 in FIG. 13, as measured at RFID detector 100, is inversely proportional to the distance in free space squared between the one of RFID tags 120 that sends the message and RFID detector 100.

Figure 14:
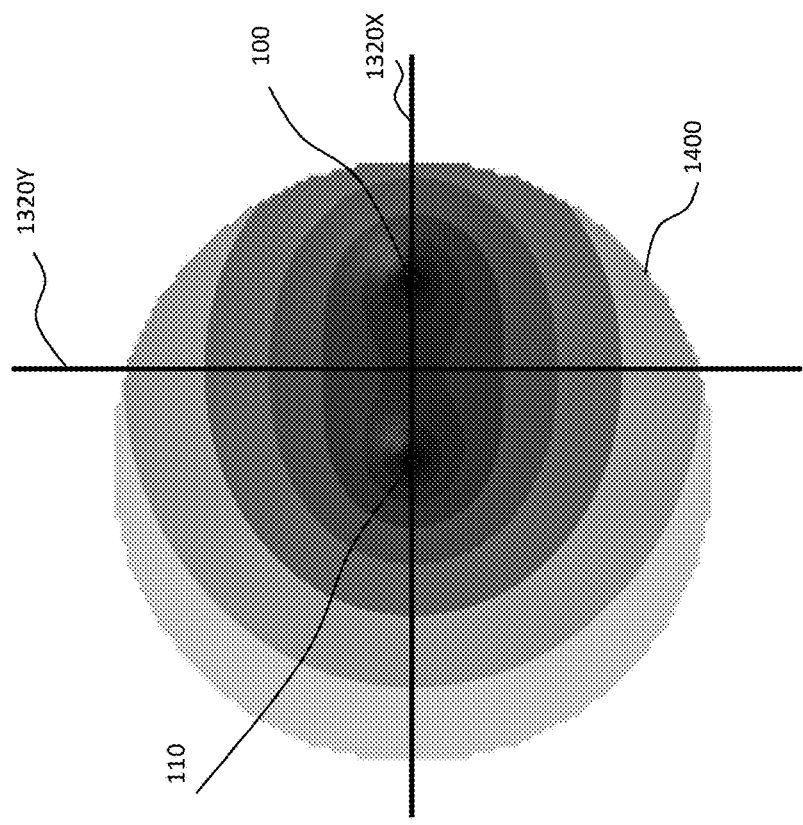
FIG. 14 shows an assumed symmetric spatial intensity distribution function that is weighted by the RSSI determined for the various spatial points at which RFID tags are located and which sent a valid signal received by an RFID detector.

The RSSI determined for the various spatial points at which RFID tags 120 are located and which sent a valid signal received by RFID detector 100 may be employed as a weighting function to an assumed symmetric spatial intensity distribution function 1400, shown in FIG. 14. For example, for perfect omni antennas, as discussed above, the assumed geographical symmetric pattern may have two foci. One of the foci of the symmetric spatial intensity distribution function 1400 is the location of the RFID detector 100. The focus may be determined by using maximum likelihood, Kalman filtering, or other optimization techniques, as will be readily apparent to those of ordinary skill in the art.

Figure 15:
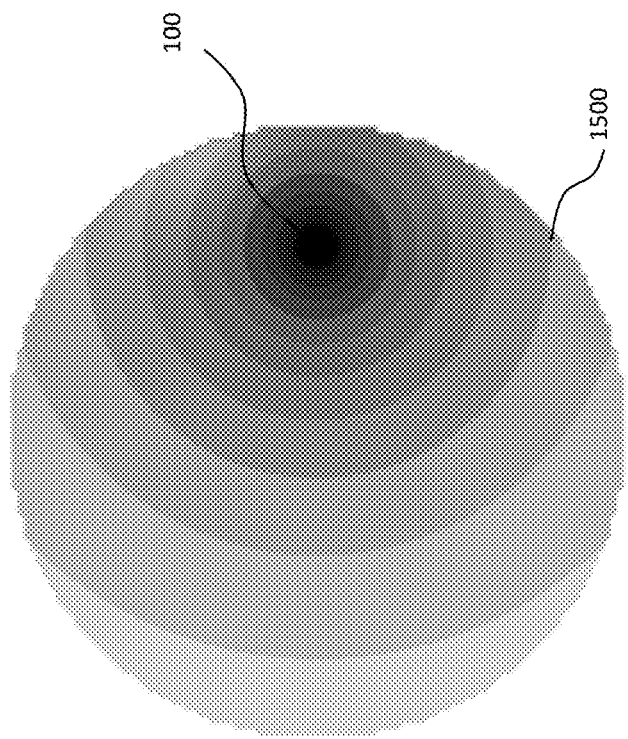
FIG. 15 shows an assumed symmetric spatial intensity distribution function that is circular symmetric with an RFID detector at the symmetric center which may result when making use of an RSSI normalization technique.

A further improvement in the accuracy of the determined location may be achieved by making use of an RSSI normalization technique, such as explained hereinbefore. For example, for perfect omni antennas, the assumed symmetric spatial intensity distribution function 1500, shown in FIG. 15, may be circular symmetric, with RFID detector 100 at the symmetric center. The symmetric center may be determined by using maximum likelihood, Kalman filtering, or other optimization techniques, as will be readily apparent to those of ordinary skill in the art.

In one embodiment of the invention, two or more RFID detectors 100 may be placed on an object to be tracked at pre-selected locations. The RSSI measurements from such additional RFID detectors 100 not only enable tracking of the object more accurately, but more importantly, can also determine certain spatial attributes, such as the orientation of the object within a spatial structure defined by the determined positions of the plurality of the RFID detectors 100. These determined spatial attributes may enable the invention to be employed in robotic and vehicular control applications.

What is claimed is:

1. A method for use by a radio frequency identification (RFID) detector for use in detecting an RFID tag to be detected in an arrangement using frequency hopping for a continuous wave (CW) radio frequency (RF) signal transmitted from a tag reader for at least activating the RFID tag, the method comprising:

receiving, by the RFID detector, the RFID detector being a separate device from the reader, a combined signal, the combined signal including at least (i) the CW RF signal transmitted by the reader and (ii) a signal backscattered from the tag based on the tag's receiving of the CW RF signal; and obtaining, by the detector, an indication of at least one characteristic of the CW RF signal transmitted from the tag reader.

2. The invention as defined in claim 1 further comprising: extracting, by the detector, the backscattered signal from the received combined signal based on the obtained indication of at least one characteristic of the received CW RF signal transmitted by the reader.

3. The invention as defined in claim 2 further comprising: determining at least one position parameter for the RFID tag based on the extracted backscattered signal from the tag.

4. The invention as defined in claim 2 further comprising: determining at least one position parameter for the RFID tag based on the extracted backscattered signal from the tag, the at least one position parameter being one of the group comprising a received signal strength indication (RSSI) of the extracted backscattered signal, a phase rotation of the extracted backscattered signal, a time stamp for the extracted backscattered signal, and a determination that the extracted backscattered signal is a valid signal.

5. The invention as defined in claim 1 wherein the extracted backscattered signal is an identifiable message from the RFID tag.

6. The invention as defined in claim 1 wherein the obtaining is performed based on the RFID detector's receipt of the CW RF signal.

7. The invention as defined in claim 1 wherein the obtaining is performed by:
receiving the indication of the at least one characteristic in digital form from a source external to the RFID detector.

8. The invention as defined in claim 1 wherein the at least one characteristic of the received CW RF signal is one of the group consisting of a frequency and a phase of the received CW RF signal.

9. The invention as defined in claim 4 wherein the RSSI is a normalized RSSI.

10. The invention as defined in claim 1 further comprising:
determining at least one position parameter based on the at least one characteristic of the CW RF signal transmitted from the tag reader; and
determining a location of the RFID tag based on the at least one position parameter.

11. The invention as defined in claim 1 further comprising:
transmitting the determined at least one position parameter to a device external to the RFID detector for use in determining a location of the RFID tag based on the at least one position parameter.

12. A method for use by a server in a system having at least two radio frequency identification (RFID) detectors, each RFID detector being for use in detecting an RFID tag to be detected in an arrangement using frequency hopping for a continuous wave (CW) radio frequency (RF) signal transmitted from a tag reader for at least activating the RFID tag, each RFID detector being a separate device from each other and from the reader and performing a detector method comprising:
obtaining, by the detector, an indication of at least one characteristic of the CW RF signal transmitted from the tag reader;
receiving a combined signal, the combined signal including at least (i) the CW RF signal transmitted by the reader and (ii) a signal backscattered from the tag based on the tag's receiving of the CW RF signal;
determining at least one position parameter for the RFID tag based on the obtained indication of at least one characteristic of the CW RF signal transmitted from the tag reader;
transmitting the determined at least one position parameter to the server;
the method comprising:
receiving the at least one position parameter transmitted by each of the at least two RFID detectors; and
determining a location for the RFID tag based on the received position parameters.

13. The invention as defined in claim 12 wherein each received at least one position parameter is one of the group consisting of: a received signal strength indication (RSSI) for the backscattered signal as extracted at each RFID detector, a phase rotation of the backscattered signal as extracted at each RFID detector, a time stamp for the backscattered signal as extracted at each RFID detector, and a determination that the backscattered signal extracted at each RFID detector is a valid signal.

14. The invention as defined in claim 12 wherein each detector performs the detector method for a plurality of tags at at least two points in time, and wherein tags of the plurality that are determined by the server to be within a prescribed range of each other at each of the at least two points in time are determined to belong to a group.

15. The invention as defined in claim 12 wherein the at least one position parameter transmitted by each of the at least two RFID detectors is a received signal strength indication (RSSI) for the backscattered signal as extracted at each RFID detector and wherein the server normalizes each received RSSI prior to determining the location for the RFID tag.

16. A radio frequency identification (RFID) detector for use in detecting an RFID tag to be detected in an arrangement using frequency hopping for a continuous wave (CW) radio frequency (RF) signal transmitted from a tag reader for at least activating the RFID tag, the RFID detector being separate from the tag reader, the detector comprising:
an antenna input adapted to receive from an antenna a combined signal, the combined signal including at least (i) the CW RF signal transmitted by the reader and (ii) a signal backscattered from the tag based on the tag's receiving of the CW RF signal and supply as an output the received combined signal; and
an RFID backscattering receiver that receives the combined signal from the antenna input and extracts therefrom the backscattered signal from the tag based on an indication of at least one characteristic of the CW RF signal transmitted from the tag reader that is obtained by the detector.

17. The invention as defined in claim 16 further comprising a carrier regenerating circuit which supplies a regenerated carrier to the RFID backscattering receiver, the regenerated carrier being based on the indication of at least one characteristic of the CW RF signal transmitted from the tag reader.

18. The invention as defined in claim 17 wherein the RFID detector further comprises a network interface which supplies the at least one characteristic of the CW RF signal transmitted from the tag to the carrier regenerating circuit.

19. The invention as defined in claim 16 further comprises a processing circuit coupled to the RFID backscattering receiver and configured to determine at least one position related parameter based the on signal backscattered from the tag.

20. The invention as defined in claim 19 wherein the RFID detector further comprises a network interface and wherein the processing circuit supplies the at least one position related parameter to the network interface for transmission via a network.

* * * * *